(12) United States Patent
Prusmack

(10) Patent No.: US 8,366,177 B2
(45) Date of Patent: Feb. 5, 2013

(54) MULTI-PURPOSE TOWED TRAILER AND COLLAPSIBLE SHELTER USED THEREWITH

(75) Inventor: A. Jon Prusmack, Valley Cottage, NY (US)

(73) Assignee: DHS Systems LLC, Orangeburg, NY (US)

( * ) Notice: Subject to any disclaimer, the term of this patent is extended or adjusted under 35 U.S.C. 154(b) by 276 days.

(21) Appl. No.: 12/806,131

(22) Filed: Aug. 7, 2010

(65) Prior Publication Data

US 2010/0319742 A1 Dec. 23, 2010

Related U.S. Application Data

(63) Continuation-in-part of application No. 12/322,062, filed on Jan. 27, 2009, now Pat. No. 8,082,938, which is a continuation-in-part of application No. 11/250,340, filed on Oct. 14, 2005, now Pat. No. 7,481,235.

(51) Int. Cl.
*B60P 3/35* (2006.01)
*E04H 15/06* (2006.01)
(52) U.S. Cl. ...... 296/168; 296/24.32; 296/161; 296/173; 135/88.15; 135/135; 52/169.12

(58) Field of Classification Search .... 135/88.06–88.08, 135/88.1, 88.13, 88.15, 135–136; 296/168, 296/173, 159, 161, 24.3, 24.32; 52/80.1–81.1, 52/68, 169.12
See application file for complete search history.

(56) References Cited

U.S. PATENT DOCUMENTS

| | | | | |
|---|---|---|---|---|
| 3,020,919 A * | 2/1962 | Crump | ...... | 135/88.13 |
| 4,109,954 A * | 8/1978 | Wall | ...... | 296/161 |
| 5,444,946 A * | 8/1995 | Zeigler | ...... | 52/86 |
| 5,797,695 A * | 8/1998 | Prusmack | ...... | 403/170 |
| 6,141,934 A * | 11/2000 | Zeigler | ...... | 52/646 |
| 7,172,231 B1 * | 2/2007 | Johnson, II | ...... | 296/22 |
| 7,258,390 B2 * | 8/2007 | Fisher et al. | ...... | 296/168 |
| 7,681,941 B2 * | 3/2010 | Freeman et al. | ...... | 296/168 |
| 7,695,049 B2 * | 4/2010 | Colborne | ...... | 296/161 |
| 7,810,866 B2 * | 10/2010 | Dempsey et al. | ...... | 296/173 |
| 2007/0262611 A1 * | 11/2007 | Freeman et al. | ...... | 296/168 |
| 2008/0258497 A1 * | 10/2008 | Oliver et al. | ...... | 296/168 |

FOREIGN PATENT DOCUMENTS

FR 2717525 A3 * 9/1995
GB 2393155 A * 3/2004

* cited by examiner

*Primary Examiner* — Winnie Yip
(74) *Attorney, Agent, or Firm* — Thomas A. Beck

(57) ABSTRACT

The present invention relates to a unique multi-purpose towed trailer unit having an aerodynamic streamlined configuration which results in less drag on the towing vehicle-trailer combination compared with drag resulting from the use of a bluff body trailer and a towing vehicle. At rest, the trailer is used in combination with a collapsible self-supporting deployable shelter which is stored in the interior of the trailer.

31 Claims, 21 Drawing Sheets

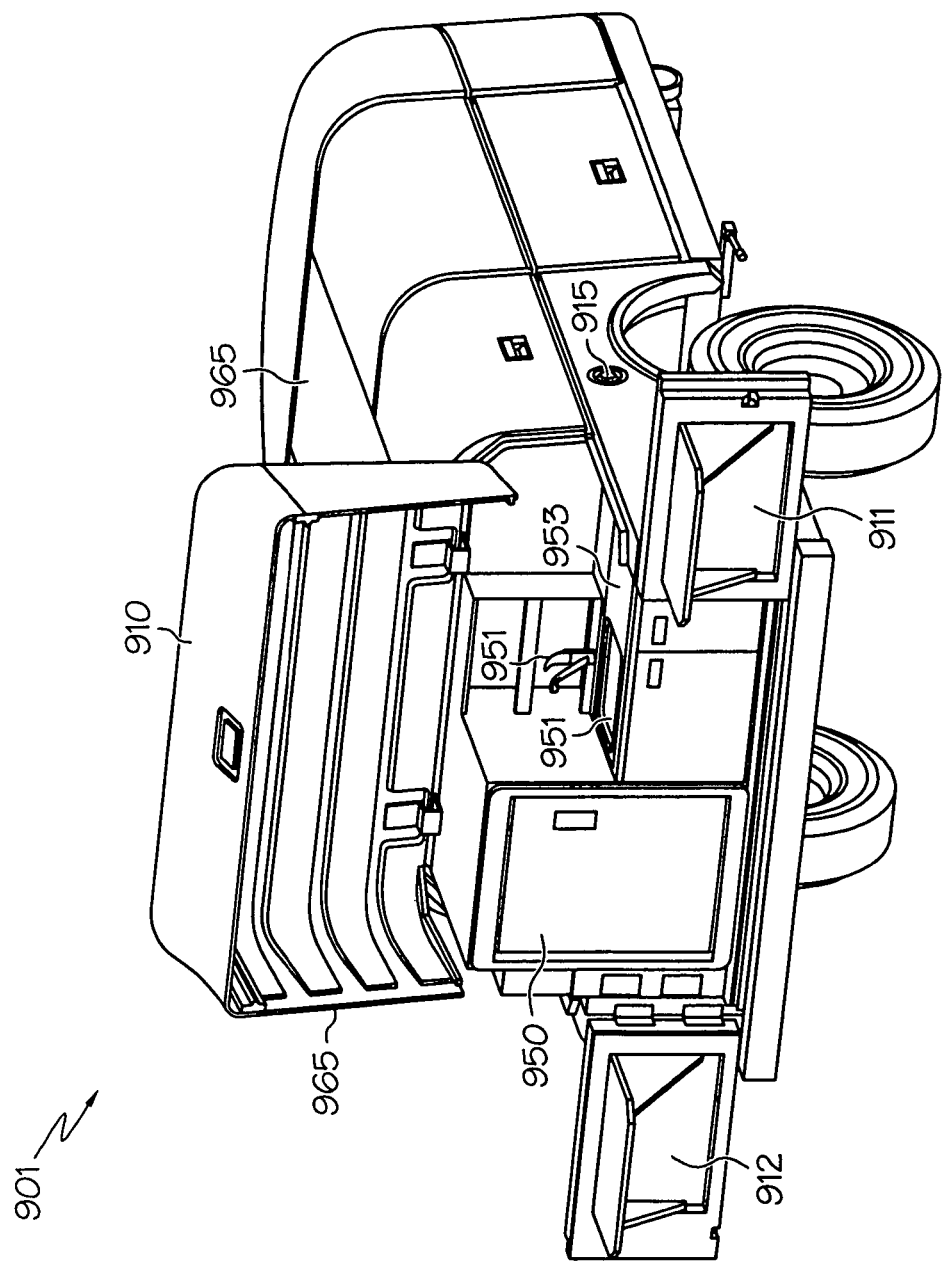

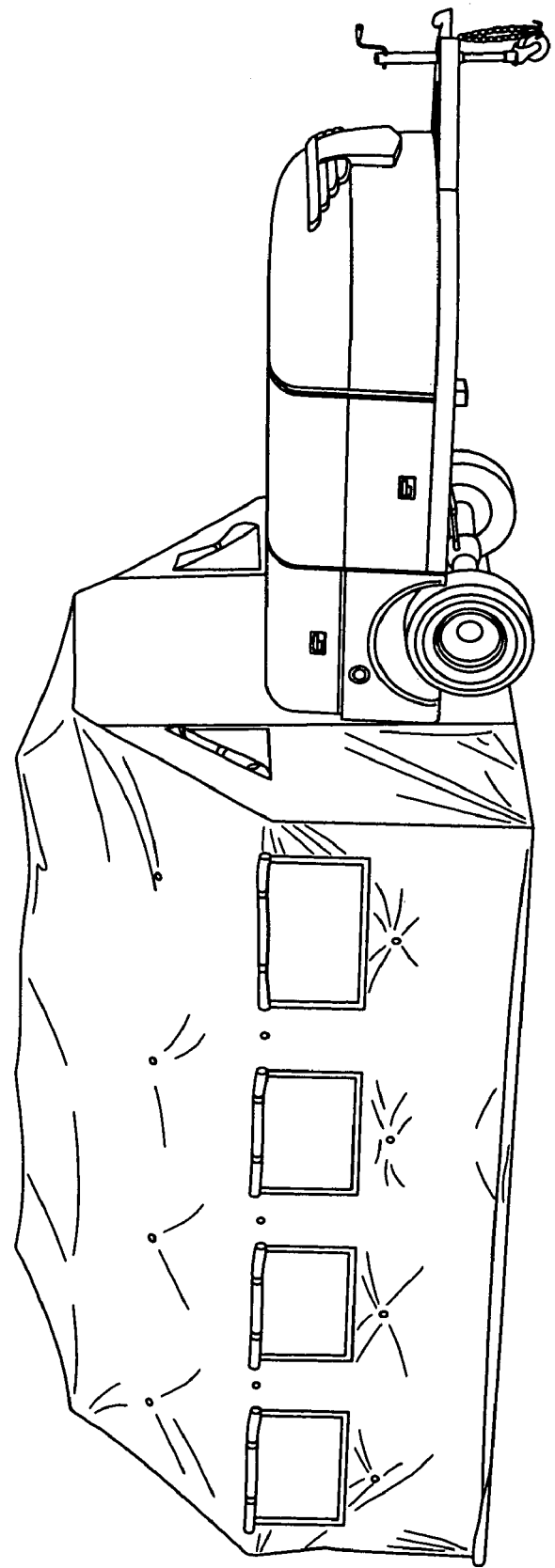

MULTI-PURPOSE TOWED TRAILER AND COLLAPSIBLE SHELTER USED THEREWITH

This application is a continuation-in-part of U.S. patent application Ser. No. 12/322,062 filed Jan. 27, 2009 now U.S. Pat. No. 8,082,938, which is a continuation-in-part of U.S. application Ser. No. 11/250,340, filed Oct. 14, 2005, now U.S. Pat. No. 7,481,235.

FIELD OF THE INVENTION

The present invention relates to a unique multi-purpose towed trailer unit having an aerodynamic streamlined configuration which results in less drag on the towing vehicle-trailer combination compared with drag resulting from the use of a bluff body trailer and a towing vehicle. At rest, he unique trailer is used in combination with a collapsible self-supporting deployable shelter which is stored in the interior of the trailer.

One useful embodiment of the present invention relates to a recreational towed vehicle camper which is a towable trailer having a streamlined body configuration resulting in greater all-around efficiency as compared with other "campers" found in the prior art. When used in combination with a collapsible shelter that is stored in said trailer, the trailer provides outdoor enthusiasts with all of the amenities of home such as fresh water, A/C power source, storage space, a complete kitchen galley and a living space within the shelter, holding from 4 to 8 people. With this self-contained pseudo-residence, outdoor enthusiasts can explore the deepest wilds and most isolated sites without the necessity of "hookups" nearer to or in civilization.

Another useful embodiment of the present invention is a towed vehicle having the aerodynamic configuration noted above, that can be used as a portable command center. It is referred to herein as an "Incident Command Post" (sometimes referred to hereinafter as "ICP") as it can be deployed quickly to the site of a catastrophic incident and serve as a field headquarters for emergency rescue personnel on site. An electronics/communications package is housed in the rear of the vehicle and a generator is stored toward the front of the trailer. The system also includes a deployable shelter which is stored within the trailer when not in use, and which is quickly erected at the site of the disaster to serve as command post headquarters. The ICP trailer is capable of navigating varying terrain and enduring extreme environmental conditions as a result of sufficient ground clearance and lightweight design. These factors allow the trailer to travel anywhere the towing vehicle can go.

BACKGROUND OF THE INVENTION

With the generation born post-World War II now reaching retirement age and having substantially more disposable income than ever before, there has been an upsurge in interest in leisure activities. The business of providing vacations has developed into a major industry world wide. The spas and resorts have grown in popularity but can come at a substantial cost. The price one has to pay for a motel or hotel with meals and other necessities and/or luxuries has compelled the wise traveler to seek another less expensive mode of vacationing.

One can obtain the benefits of home comfort and conveniences using a campsite and the proper affordable means for camping. Whether the rationale is economy, communing with nature, or both, camping is an ideal way to vacation. However if one wishes to camp and have many of the benefits of home, one must go to a campsite and use the "hookups" provided by the commercial campsite owners, obviously for a fee.

The present invention relates to a camper which provides all of the convenience of home living and the benefits of traveling economically, while concurrently allowing the traveler to set up camp wherever he/she may desire.

There is another use for the trailer of the present invention which is diametrically opposite from that of recreational camping. The hostile environment in the world today and the natural disasters worldwide which seem to occur all too frequently today have resulted in a greater awareness to be prepared for any type of emergency that might arise, whether it be from natural disasters such as fires, earthquakes, flooding, etc., or from terrorists or saboteurs seeking to destroy the infrastructures of our cities or very specific targets.

When any catastrophic or emergency incident of the type mentioned above occurs requiring site management and/or rescue of personnel etc., it is imperative to promptly move men and materiel to the site of the disaster or scene of destruction so that rescue efforts can proceed promptly, smoothly and efficiently. The person in charge of the emergency operation must be able to communicate with his team members in the field so that all can be kept apprised of developments when they occur. In the past, the operation would be conducted using walkie-talkies or other rudimentary cellular devices or from a headquarters location far removed or remote from the scene of the disaster. This has not proven to be successful as the full array of support equipment is not on the scene to direct all aspects of the operation.

The solution to this problem found in the prior art is to use the trailer of the present invention in the form of an Incident Command Post (ICP) containing equipment and paraphernalia which can expedite a search/rescue operation. The incident command post trailer of the present invention, carrying within it all elements found in a command headquarters usually located at a site remote from the scene of activity in the past, is the answer to the stated problems found in the prior art.

U.S. Pat. No. 1,422,498 discloses a camping trailer which is designed to eliminate the discomforts and inconveniences noted by providing a trailer to be drawn by a car containing the campers, in which living necessities are either provided or ample space is provided for the packing and carrying of such articles that may be desired or necessary to take along.

U.S. Pat. Nos. 3,070,399 and 4,114,942 disclose expandable house trailers, each suitable for use as a camper. The trailers disclosed both possess bluff bodies facing the wind head on when being towed by a vehicle and therefore would generate substantial drag on the combination towing vehicle and trailer unit.

U.S. Pat. No. 3,070,399 discloses a truck mounted camper having a tent permanently mounted upon the top of the truck which can be unfolded to provide an additional enclosed area to the rear of the truck. There is no trailer in this disclosure and the tent in this case is stored on the top of the truck thereby increasing the drag the truck in normally subjected to.

U.S. Pat. No. 6,017,080 discloses a rectangular shaped tent camper with a slide-out room. When the camper is in its collapsed compact alignment with low profile, its front possesses a bluff body facing the oncoming air flow when moving forward and thus creates a substantial amount of drag.

Publication WO/1985/001260 entitled "Streamlining Device for a Towing Vehicle" relates to a trailer. Because of the design of trailers, they form a very high air resistance when trailed behind the moving vehicle. The reference discloses reduction of air resistance by covering the area between the roof of the trailing car and the front part of the trailer.

There is additional prior art in which the camping is done in a self propelled vehicle which is not relevant to the instant invention as the camper of the present invention is towed by a vehicle. The prior art disclosed above is irrelevant because they are "bluff bodies", not streamlined, and as such, when in motion, the air flow will normally separate from all of the relatively sharp edges of the units disclosed thereby increasing the drag thereon.

With the price of gasoline and other petroleum based products rising exponentially, it is necessary to lower the costs associated with recreational camping if that sport is to continue to grow at a steady rate. The trailers found in the prior art consist mainly of "bluff bodies" which when moving behind a towing vehicle show a frontal area that is impacted directly by the air flow emanating from the rear of the towing vehicle which slows the towing vehicle to a considerable extent. The trailer of the present invention possesses a streamlined body facing into the oncoming wind stream behind the towing vehicle. The multi-purpose trailer is streamlined to reduce the resistance to forward movement resulting from the drag and yaw forces thereon and materially reduces drag.

The force on an object that resists its motion through a fluid is called drag. When the fluid is a gas like air, it is called aerodynamic drag (or air resistance). In characterizing drag, the term "parasite drag" is commonly used. Parasite drag is the sum of Pressure Drag (Form Drag) and Skin Friction (Viscous Drag).

The portion of the drag force that is due to the inertia of the fluid—the resistance to change that the fluid has to being pushed aside so that something else can occupy its space—is called the pressure drag (or form drag or profile drag).

Most parasite drag is caused by the pressure difference between the front and rear of the any other three dimensional "form" moving through the air. The amount of pressure drag depends upon the size and shape of the object.

Drag increases with the density of the fluid ($\rho$). An increase in the density of the fluid increases the mass of the fluid, which results in increased inertia, which in other words means more resistance of the fluid to getting out of the way of the vehicle seeking to occupy the location of the fluid and replace it. Drag also increases with area. (A), i.e., for purposes of this invention, area is the cross sectional area projected in the direction of motion. Taking the cross section of the object in the direction of its motion, this is the cylinder of fluid that must be cast aside to let the object proceed.

Fluids (air) also have viscosity. It is less apparent than with a liquid, however the air does cling to a body as it moves through it. This creates a small amount of skin friction on the surface of the body.

When any gas flows over a surface, the viscous effects are confined to a thin layer just above the surface of any object moving through a fluid. This is thin layer is known as the "Boundary Layer." The boundary layer exerts a drag force on the surface over which it flows, trying to pull the surface along in the direction of the air. All viscous effects take place in the boundary layer. The average streamline velocity varies from zero at the surface to free stream velocity at the upper edge of the boundary layer. Free stream velocity is essentially synonymous with relative wind, which in turn equals the velocity of the vehicle. The amount of Viscous drag (skin friction) depends (inter alia) on three factors:
1. Velocity of the gas
2. Viscosity of the gas
3. Length of the surface over which the gas flows The inclusion of the "length" parameter means that more total drag will occur if fluid flows for many feet over a "long" object than if the same gas flows a short distance over a shorter object. Viscous Drag is the product of Velocity×Viscosity×Distance.

A streamline is a line along which a series of air particles move. Any particle on a streamline will follow the same path around an object as all the other particles on that streamline. Once a particle is on a given track it remains on that track (streamline) and follows the particle ahead of it.

Flow separation increases drag. When driving a vehicle which is pulling a trailer behind it, theoretically speaking, an area of low pressure will form over the windshield of the towing vehicle. An area of high velocity and low pressure will exist along the top of the vehicle. The airflow should decelerate as it turns downward along the back of the vehicle. This would cause the pressure to return to atmospheric pressure behind the van. In actual fact, with respect to the front of the vehicle, as the velocity of the fluid impinging on the front of the vehicle, especially the windshield increases, the pressure decreases. As the flow proceeds along the top of the vehicle, it moves relatively smoothly. However, the air particles in the boundary layer are unable to make the sharp change in direction and velocity required to negotiate the downward curve at the back of the van, especially in the presence of the adverse pressure gradient created by the low pressure along the roof.

The result is "flow separation." The air behind the vehicle winds up moving faster than it ideally should. Bernoulli's equation tells us that the higher velocity will be accompanied by a lower pressure. This equation relates the pressure, velocity and height in the steady motion of an ideal fluid. The usual form is $v^2/2 + p/\rho + gz = $ constant, where v is the velocity at a point, p the pressure, $\rho$ the density, g the acceleration of gravity, and z the height above an arbitrary reference level. As a result, the pressure behind the van is much lower than atmospheric pressure and the air is "tumbling" in a pattern referred to as "eddies."

It is mostly the low pressure behind the van which causes pressure drag. It acts similar to a vacuum sucking up the dust from the road, making the back of the vehicle, especially a bluff body van very dirty.

The above explanations are the fundamental reasons for most pressure drag on objects moving through the air; i.e., most pressure drag is due to low pressure behind the object, rather than high pressure ahead of the object.

It has been determined that when the air separating from the towing vehicle in the form of the eddy currents noted above, impinges on the front of a bluff body trailer, the parasite drag on the joined assembly increases substantially. When the air attempts to flow around the back of, e.g., a towing vehicle, the adverse pressure gradient soon causes the boundary layer to separate and the drag to increase dramatically.

The developed trailer of the present invention is in general a fairing which possesses a streamlined shape, especially the front or nose of same, so that the air is allowed to gradually decelerate along the back part of the trailer. This helps prevent the boundary layer from separating, and thus produces much less pressure drag.

The modern vehicles (automobiles and trucks) of today tend to possess a more streamline shape than their former counterparts, so when in motion, the vehicle, (in the case of the present invention, the towing car or truck) moves the oncoming air more smoothly out of the way, so there is less separation and formation of eddy currents at the rear of the vehicle the past. The instant combination of the streamlined automobile and the streamlined trailer result in less drag than combinations found in the prior art.

The side view of the profile of the front nose of the trailer of the instant invention follows a line having the general form of the equation $y=1+\log_{10}X$ in the first and fourth quadrant of a unit circle. A top view of the lines forming the leading edge and sides of the trailer is that of a parabola. The three dimensional configuration having the streamlined shapes along the horizontal and vertical cross sectional axes results in a trailer possessing reduced drag when towed by a vehicle compared with the bluff bodied trailer found in the prior art. Experimental results show that the parasite drag which as noted is the sum of the pressure drag and the viscous drag in the vehicle-instant invention trailer combination is less than the parasite drag resulting from a towing vehicle-bluff body trailer.

SUMMARY OF THE INVENTION

One aspect of the present invention relates to inter alia, a recreational towed vehicle camper and to an ICP which is a towable trailer having a streamlined body configuration which results in greater all around drag reduction efficiency than other trailers found in the prior art.

The present invention is a towable trailer which carries within it a multi-stage tent which, when erected, is secured onto the rear of the trailer. The present invention relates a towable trailer which carries inter alia, a multi-stage tent which when erected is connected on and over the rear of the trailer. The trailer unit of the present invention is capable of a variety of uses from recreational camping to serving as a deployable communications center to be used in the event of national, state or local emergencies. The trailer unit has a plurality of storage compartments integrated therein which can be used for whatever purpose the trailer is intended to serve, be it for recreational camping or for emergency command center communications center (ICP).

More specifically the invention relates to a multi-purpose towable trailer comprising an undercarriage assembly frame having an axle and a set of wheels, a housing which is an elongated streamlined body mounted on and secured to the undercarriage assembly frame.

As used herein "housing" refers to the peripheral exposed surface of the trailer including the front bumper immediately beneath a hood, side and rear doors and the top.

The elongated streamlined body has a housing with a top, a base interior floor which runs the length of the trailer, a front section, a curb side, a road side, a rear section and three separate inverted U shaped framework bulkheads. Each bulkhead is secured to the floor and extends upwardly therefrom and is secured to the underside of the top of the trailer.

The top is a stringer-like member extending from a first framework bulkhead adjacent the front section to a third framework bulkhead at the rear section of the trailer. It is a plank-like element which serves to proved longitudinal stability to the trailer and is used to secure the various doors of the unit in place. The top has a curb side and a road side and the doors on each side of the trailer are connected to the sides of the top depending upon which side the doors are located.

As used herein, "curbside" refers to the side of the trailer adjacent the curb or edge of the road over which the trailer is traveling. In an automobile, the curbside would be the front seat passenger's side.

The term "roadside" refers to the side of the trailer adjacent the center of the road over which the trailer is traveling. In an automobile, the roadside would be the driver's side.

The front section of the trailer consists of a front bumper or skirt, and a front hood positioned atop the bumper in registry with it and contiguous with it. A top view of the front bumper and the hood have body contours approximating a substantially parabolic configuration wherein $f(x)=ax^2$ where a>1, in the horizontal plane as shown in FIG. 1A, (as derived from the standard equation that has the form:

$$(y-k)^2=4a(x-h)$$

where h and k are the x- and y-coordinates of the vertex of the parabola and a is a non-zero real number, such that the shape of parabola stretches out sideways away from the axis of symmetry.

A side view of the front section of the trailer has a body contour from a vertical perspective approximating a logarithmic function configuration substantially according to the equation $y=1+\log_{10}X$ within the first and fourth quadrants of a unit circle as shown in FIG. 1B.

When the front of the trailer conforms to the shapes substantially as detailed in FIGS. 1A and 1B, there is improved drag reduction compared with prior art bluff bodies trailers.

There are three bulkheads which form the support for the housing of the trailer. The hood at the front of the trailer is hingedly affixed to the first bulkhead toward the front of the trailer. The hinge enables the hood to be opened and closed.

There is a first upright interior wall within the housing secured to the first bulkhead. The first upright wall, the floor located in the interior of the trailer, i.e., enveloped by the housing, the bumper and the hood define a first storage compartment in the trailer housing.

On the curbside of the trailer, there is a first gull wing door hingedly affixed to a curb side of said top, and on the roadside of the trailer there is a first gull wing door hingedly affixed to a road side of the top.

The second upright interior wall within said housing is secured to the second bulkhead. The second upright wall, the floor, the first interior upright wall and the space between the curbside first gull wing door and the first roadside gull wing door defines a second storage compartment in trailer housing.

On the curbside of the trailer, a second gull wing door is hingedly affixed to the curb side of the top, and on the roadside of the trailer a second gull wing door is hingedly affixed to a road side of the top.

There is a third upright interior wall within the housing secured to the third framework bulkhead. The third upright wall, the floor, the second interior upright wall and the space between the curbside second gull wing door and the second roadside gull wing door define a third storage compartment in the trailer housing;

Beneath the second curbside and roadside gull wing doors, a curbside and roadside fender panel respectively extends longitudinally to the rear of said housing.

The rear comprises a rear door atop and in registry and contiguous with a curbside tailgate and a roadside tailgate. The rear door has three sides and a top planar surface and is hingedly affixed to the third bulkhead. The rear end portion of the top planar surface has a Knolls edge profile substantially as shown in FIG. 1C to allow the air flowing over said top to separate smoothly from said housing with a minimum of turbulence.

There is a curbside tailgate and a roadside tailgate hingedly affixed to the curbside wheel panel and said roadside wheel panel respectively.

The third interior upright wall and the space between the curbside wheel panel and the roadside wheel panel and the curbside tailgate and the roadside tailgate and the top and sides of the rear door, defines a fourth storage compartment in said trailer housing which contains to achieve the use to which the trailer is being put. All of the doors associated with the trailer have latches to secure them in place.

BRIEF DESCRIPTION OF THE DRAWINGS

FIG. 9 is an isometric view of the recreational trailer embodiment of the present invention showing the rear section with kitchen appliances, raised rear door and curbside and roadside tailgates and curbside.

FIG. 13 is an isometric view of the recreational trailer or alternatively the incident command post trailer of the present invention in combination with a large shelter of the invention.

DESCRIPTION OF THE PREFERRED EMBODIMENT

Figure 1A:
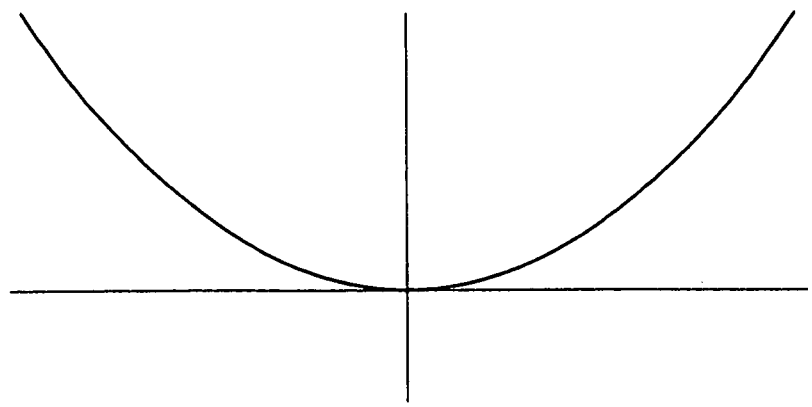
FIG. 1A is a graph representation of the top view of the profile of the front nose of the trailer which is a substantially parabolic configuration in the horizontal plane according to the general formula $y=ax^2$ wherein a>1.
Figure 1B:
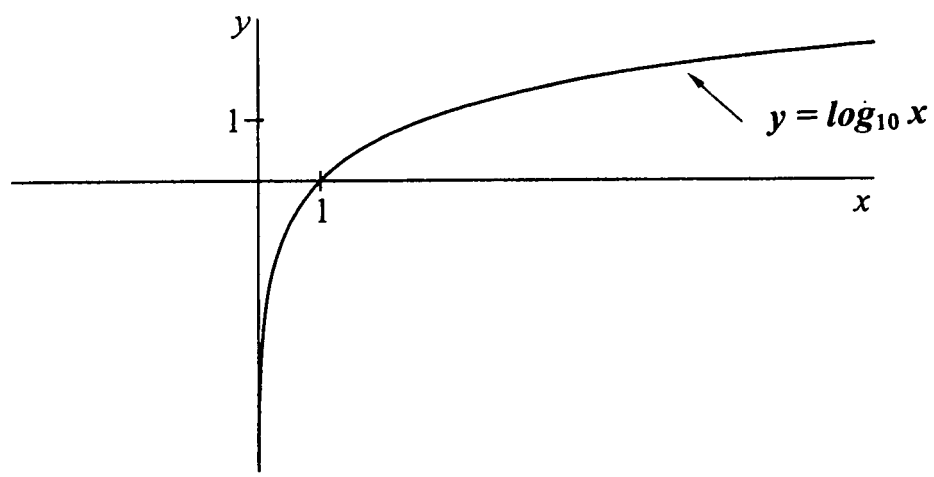
FIG. 1B is a graph representation of the side view of the profile of the front nose of the trailer which is a logarithmic function configuration in the vertical plane according to the equation $y=1+\log_{10}X$ in the first quadrant of a unit circle.
Figure 1C:
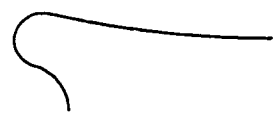
FIG. 1C is a cross sectional view of the configuration of the trailer's rear end portion of the top planar surface which is a Knolls edge profile which allows the air flowing over the top of the trailer to separate smoothly from the housing with a minimum of turbulence.

The recreational trailer or alternatively the ICP trailer of the present invention has the same exterior appearance regardless of which embodiment the trailer is put. The interior of the rear section of the trailer will differ whether a fully outfitted kitchen camping facility is used or a radio command post transmitter-receiver unit, etc. is in place.

The trailer of the instant invention is aerodynamically efficient as compared with the bluff body trailers of the prior art. It is determined that when considering the unit comprising the towing vehicle and the trailer behind it, the onrushing air that is occasioned by the towing vehicle moving forward, is deflected outwardly where it then leaves the surfaces of the towing vehicle and moves across the gap existing between the towing vehicle and the trailer and then reattaches to the front and/or sides of the trailer.

Viewing the trailer from the top of same, in keeping with its cross sectional parabolic design along the horizontal plane, the sides both flair outwardly and diverge from each other, as these sides extend from the front area of the trailer to the rear. Further then, in keeping with its cross-sectional logarithmic curve design along the vertical plane, the top of the trailer flairs or slopes upwardly from the front of the trailer to the rear edge of the trailer such that the rear edge of the trailer is higher than the leading edge at the front nose of the trailer.

As the airflow from the towing vehicle attaches to the front nose of the trailer, the slipstream generated travels smoothly along the sides of the housing and along the top, following the contours of the housing and a smooth attached flow with minimal drag is achieved The top edge of the rear door has a "Knoll's edge" profile which enables the attached flowing air to separate from the housing with a minimum of turbulence, thus minimizing the added drag-inducing eddy currents usually associated with separation of an air stream at the back of a moving vehicle.

The trailer which has application as a recreational camper is, as noted, a towable trailer with a multi-stage tent extension which, when the trailer is at rest, is attached to the rear of the trailer. The rear of the camper unit has complete kitchen facilities built into the rear portion of the trailer. The trailer has plastic gull wing doors on both sides of the trailer to allow easy access to the contents, such as a tent, stored therein. Other necessary accessories can be stored in various sections of the trailer such as a water source, gasoline powered generator and personal possessions needed for the trip.

When the trailer is used a command center, it has been found to be a complete lightweight transportable command solution to mobilizing a fully operational interoperable incident command post quickly and efficiently. With the towing vehicle and trailer, it is possible to navigate varying terrain and extreme environmental conditions with the result that it can go and provide the necessary functions anywhere a car or van can go. The ICP/Camp trailer has a clearance of 17 inches from the bottom of the axle to the ground for transport on rough terrain.

Once on the incident scene, a minimum of personnel can deploy the double-wall, insulated shelter. The rear compartment of the trailer is outfitted with the latest communication equipment. For example, the tent is stored in one compartment prior to being erected. The incident command post in the rear of the trailer has a generator, interoperable communications equipment including satellite communications, internet access and in integrated command and control system all within a manageable footprint.

The command post in the trailer facilitates communication between land mobile radios, multichannel radios, cellular and landline phones. An optional communications suite to be used with the command post includes a radio bridge for departmental interoperability, teleconference capabilities, satellite TV (with dish), phone and internet capabilities as well as a display system for in-field information viewing.

Figure 1:
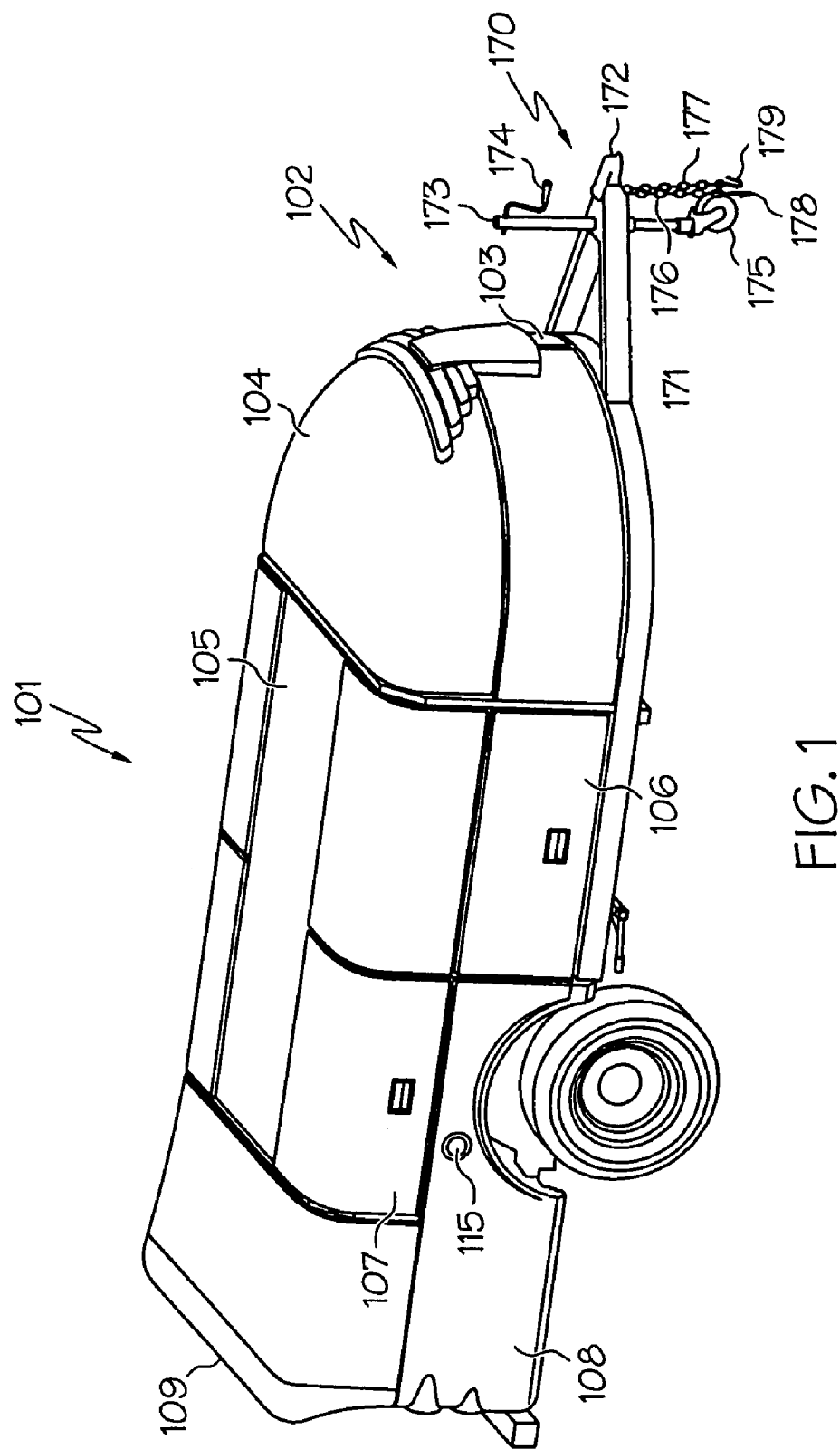
FIG. 1 is an isometric view of the curbside of the recreational trailer or alternatively the incident command post trailer of the present invention showing the curbside, top and front of the invention.

Referring to the drawings, FIG. 1 is an isometric view of the curbside of the dual purpose trailer 101 of the present invention showing the curbside, top and front of the unit. The trailer consists of streamlined body atop a wheeled undercarriage assembly comprising a durable frame and solid axle and has a pair of pneumatic tires, preferably puncture proof, as shown in FIG. 1. However, depending upon the use to which the trailer will be put, solid urethane or other type tires can be used if needed. The body of trailer 101 has a front section 102 comprising front bumper section 103 configured parabolically along the horizontal plane to offer minimum resistance to a fluid flow emanating from the back of the towing vehicle and a hood section 104. Bumper section 103 is segmented into two separate arcuate sections (See FIG. 8) which can be removed from the front end of the trailer to allow access to the items stored therein such as pressurized gas containers and/or a generator in the case of the recreational camper embodiment or an A/C unit in the case of the ICP unit. A portion of the moving air fluid wake at the rear of the towing vehicle impinges on bumper section 103 and flows around the front of the trailer and down the sides with a minimum of separation from the top and sides of the body. A higher portion of the wake described above impinges on the hood section 104 of trailer 101 and flows around the sides of hood section 104 as well as up and along the top surface 105 of trailer 101.

Immediately behind front section 102 on the curbside of the trailer are curbside doors 106 and 107. Curbside wheel panel 108 is located immediately below curbside door 107. Trailing edge 109 of the trailer flares upwardly along the plane following top surface 105. This upward flare allows the fluid flowing along the top of the trailer to separate with a minimum of drag.

Also referring to FIG. 1, a hitching system 170 is illustrated at the front of the trailer. The hitching system 170 is designed to facilitate a vehicle operator securing the hitch components of a towing vehicle (not shown) and the towed trailer of the present invention. The towing vehicle (not shown) generally includes a metal bumper assembly, below which a towing vehicle hitch component is mounted. The towing vehicle hitch component can conveniently be a metal hitch-ball although other types of hitch components are non-metallic hitch components and ball-receivers.

FIG. 1 depicts the towed vehicle hitch component 170 at the front end of the trailer which hitch 170 is attached to a trailer tongue (in this case brackets) 171 for permitting the towed trailer 101 to be hitched to the towing vehicle (not shown). In the preferred embodiment, the towed trailer hitch component 170 is a metal ball-receiver, although employing the hitching system with other hitch components such as non-metallic hitch components and hitch-balls also may be used. An adjustment shaft 173, crank 174 and wheel assembly 175 attached to trailer tongue 171 provide a support point when the trailer is disconnected from the towing vehicle. The trailer hitch also contains safety chains 176 and 177 which are connected at one end to the front of the trailer tongue and to eye bolts or the like on the rear of the towing vehicle (not shown) by snap hooks 178 and 179.

Figure 2:
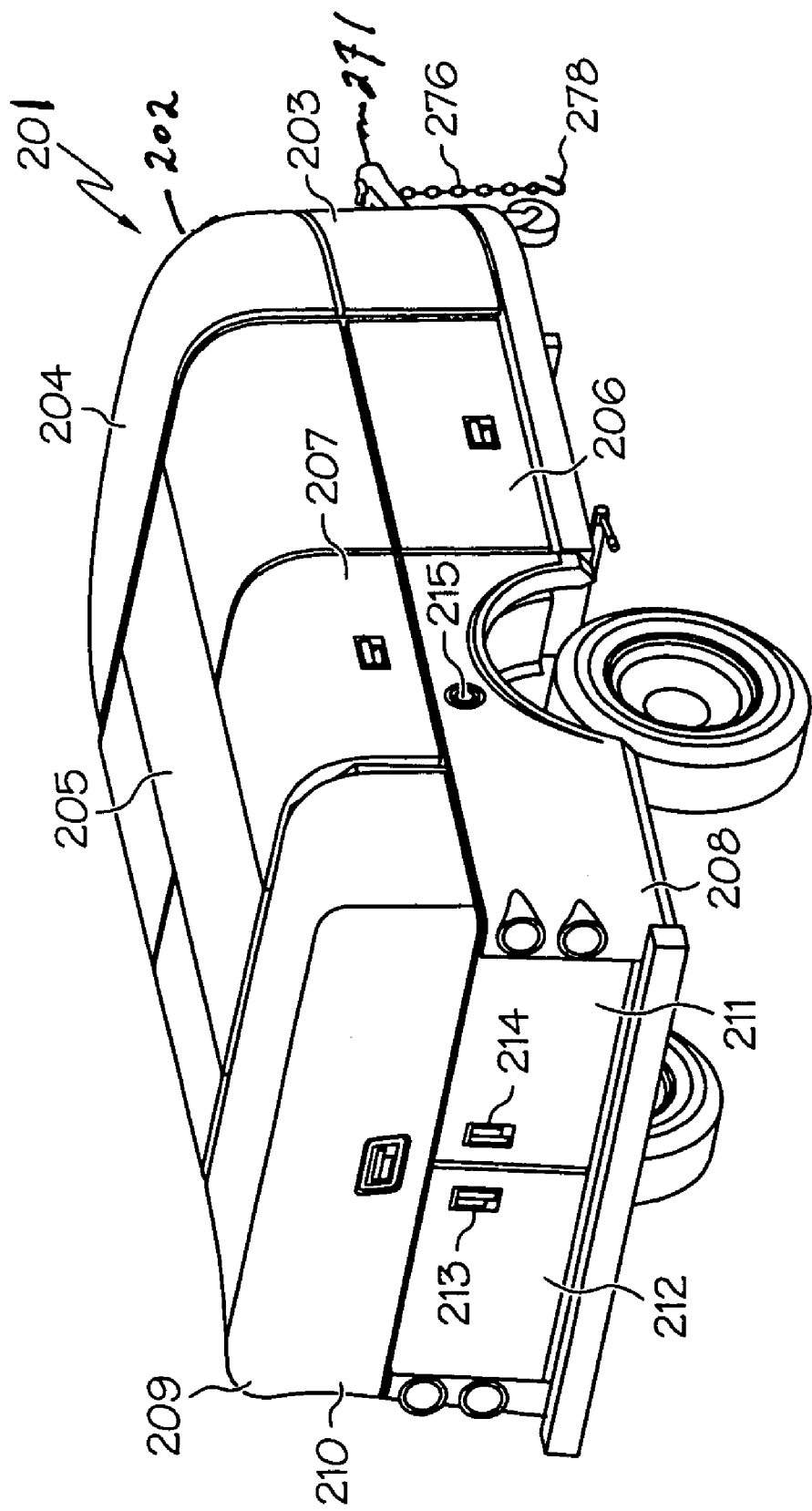
FIG. 2 is an isometric view of the curbside of the recreational trailer or alternatively the incident command post trailer of the present invention showing the curbside, top and rear of the invention.

FIG. 2 is an isometric view of the curbside, rear and top view of the trailer. FIG. 2 shows trailer 201, front section 202, front bumper section 203, hood section of the trailer 204, top surface 205, curbside doors 206 and 207, curbside wheel panel 208 and trailing edge 209. FIG. 2 also shows rear door 210, curbside tailgate 211 and roadside tailgate 212. The rear door and tailgate units each have a latch 213, 214 to allow opening, closing and securing same. FIG. 2 shows trailer tongue 371, safety chain 376 and hook 378.

Figure 3:
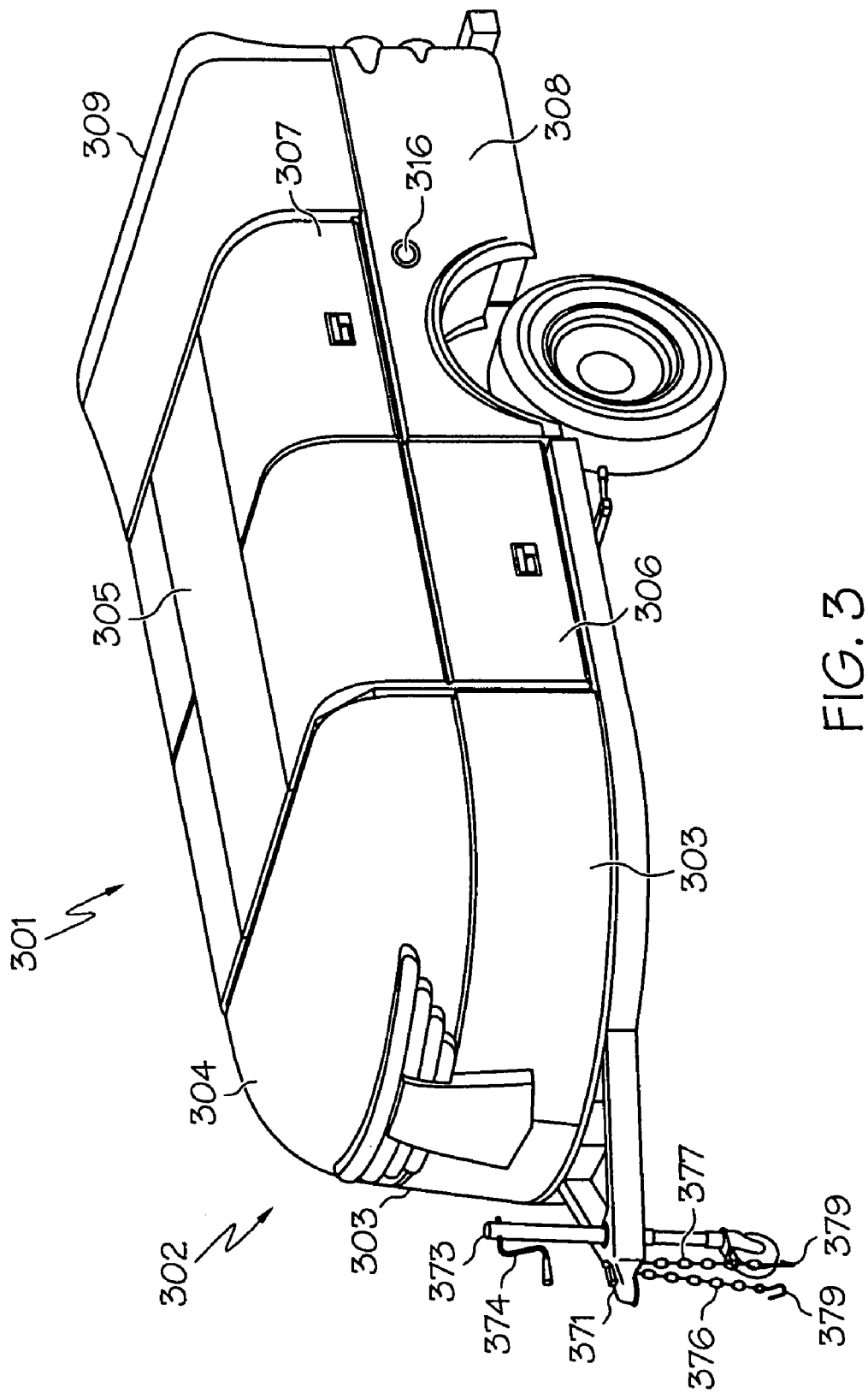
FIG. 3 is an isometric view of the roadside of the recreational trailer or alternatively the incident command post trailer of the present invention showing the top and front of the invention.

FIG. 3 is an isometric roadside view of trailer 301 showing the roadside, top 305 and front 302 of the dual purpose trailer. Trailer 301 has a front section 302 comprising front bumper section 303 and a hood section 304. Like its mirror image on the curbside, the front bumper section is configured parabolically along the horizontal plane to offer minimum resistance to a fluid flow emanating from the back of the towing vehicle and less deleterious separation thus offering improved aerodynamic benefits. A portion of the moving fluid (air) wake at the rear of the towing vehicle impinges on bumper section 303 splits into two streams which flow around the front of the trailer substantially adhering to same and along the sides with a minimum of separation from the sides of the body. Another portion of the wake described above impinges on the hood section 304 of the trailer and flows up and around the curvature of hood section 304 as well as up and along top surface 305 of the trailer. FIG. 3 shows a different view of the trailer hitch described above Behind front section 302 on the roadside of the trailer are roadside doors 340 and 341. Roadside wheel panel 342 is located immediately below roadside door 341. Trailing edge 309 of the trailer flares upwardly from the front of the trailer in a gradually rising plane forming top surface 305.

Figure 4:
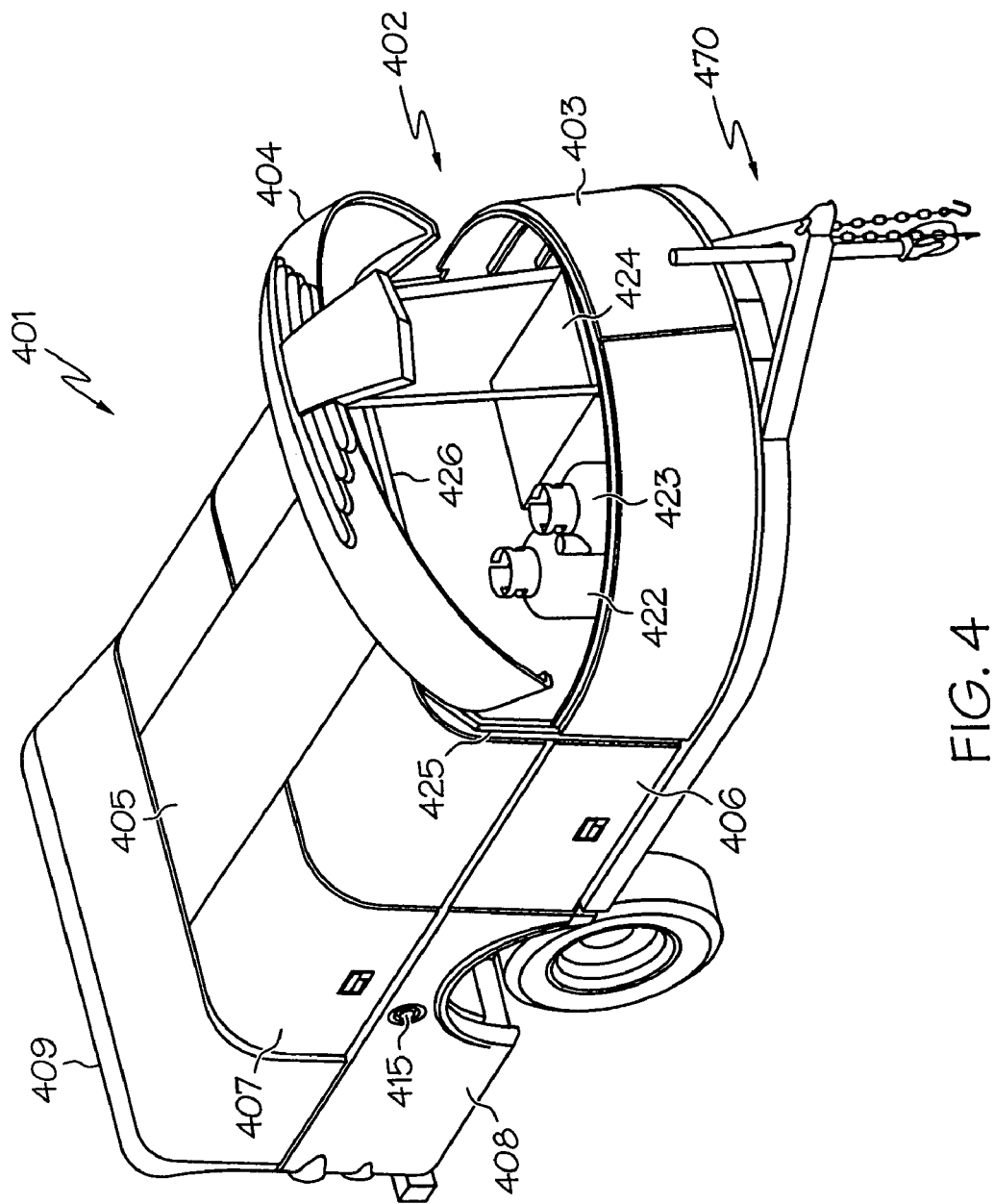
FIG. 4 is an isometric view of the curbside of the recreational trailer or alternatively the incident command post trailer of the present invention showing the raised hood, front panels, storage area and curbside of the invention.

FIG. 4 is an isometric view of the front curbside of trailer 401 of the present invention showing the front section 402 the front bumper 403, raised hood 404 and the storage area 420 within the hood. The hood is held up by a hood prop rod 421 to allow access to the items stored in the interior of the hood. In FIG. 4, two compressed gas tanks 422 and 423 are shown along with an alternating current generator 424 used to provide a supply of electricity in conjunction with the purpose to which the trailer is to be put.

FIG. 4 shows a more frontal view of the trailer hitch as described above in FIG. 1. Raised hood 404 is secured to a framework bulkhead 425 by means of a piano or continuous type hinge unit 426. The curbside of trailer 401 has doors 406, 407, rear panel 408 and rear end 409.

Figure 5:
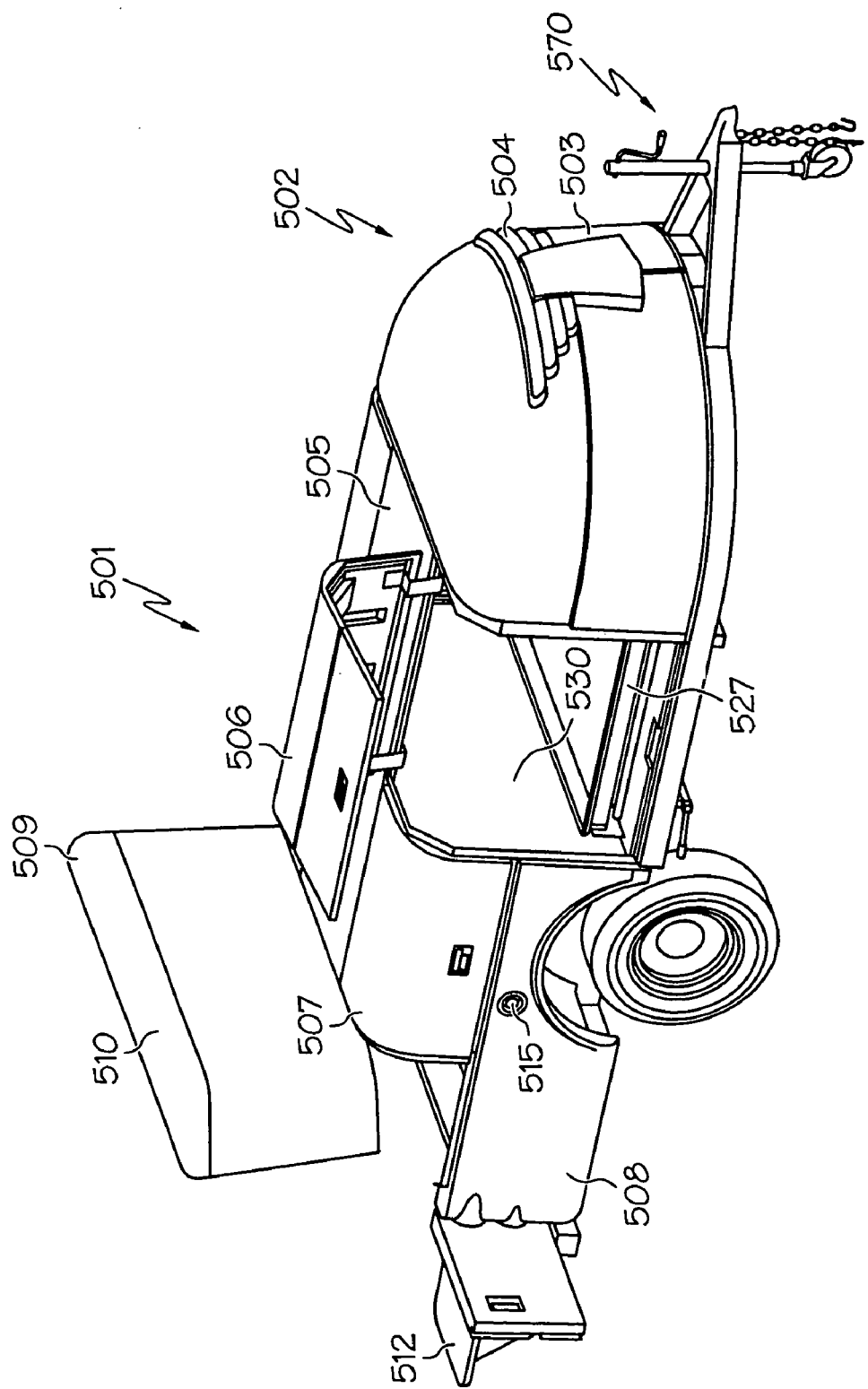
FIG. 5 is an isometric view of the curbside of recreational trailer or alternatively the incident command post trailer of the present invention showing the first raised curbside gull wing door, storage space, raised rear door and tailgate of the invention.

FIG. 5 shows a front isometric view of the curbside of the dual purpose trailer 501 of the present invention showing the curbside, top 505, front section of the trailer unit comprising front bumper section 503 and hood section 504.

Immediately behind front section 502 on the curbside of the trailer is curbside gull wing door 506 which is in a raised and open position and door 507. As used herein the expression "gull wing door" refers to a door on a vehicle that is hinged at the top, opens upward, and, in the open position, resembles an airplane gull wing. FIG. 5 also shows rear door 510 raised in the open position, and curbside tailgate 511. The trailer hitch 570 shown in FIG. 5 contains the elements as described above.

Gull door 506 opens to provide access to a second storage space continuously extending within the trailer from curbside to roadside and between the walls 527 and 528 (not shown) secured to first and second bulkheads 525 and 526. Within this second storage space defined hereinabove is positioned a slideable tray 529 which can contain and support a deployable shelter tent (not shown) which is stored thereon in the trailer when it is in transit. When it is desired to set up the camp/ICP, door 506 is opened and the tray 529 containing the shelter (not shown) is slid out from within storage space 530 and removed to the rear of the trailer, placed in position, erected and secured to the rear section of the trailer such that the rear section of the trailer comprising door 510, curbside tailgate 511 and roadside tailgate (not shown) are situated within the erected shelter.

Figure 6:
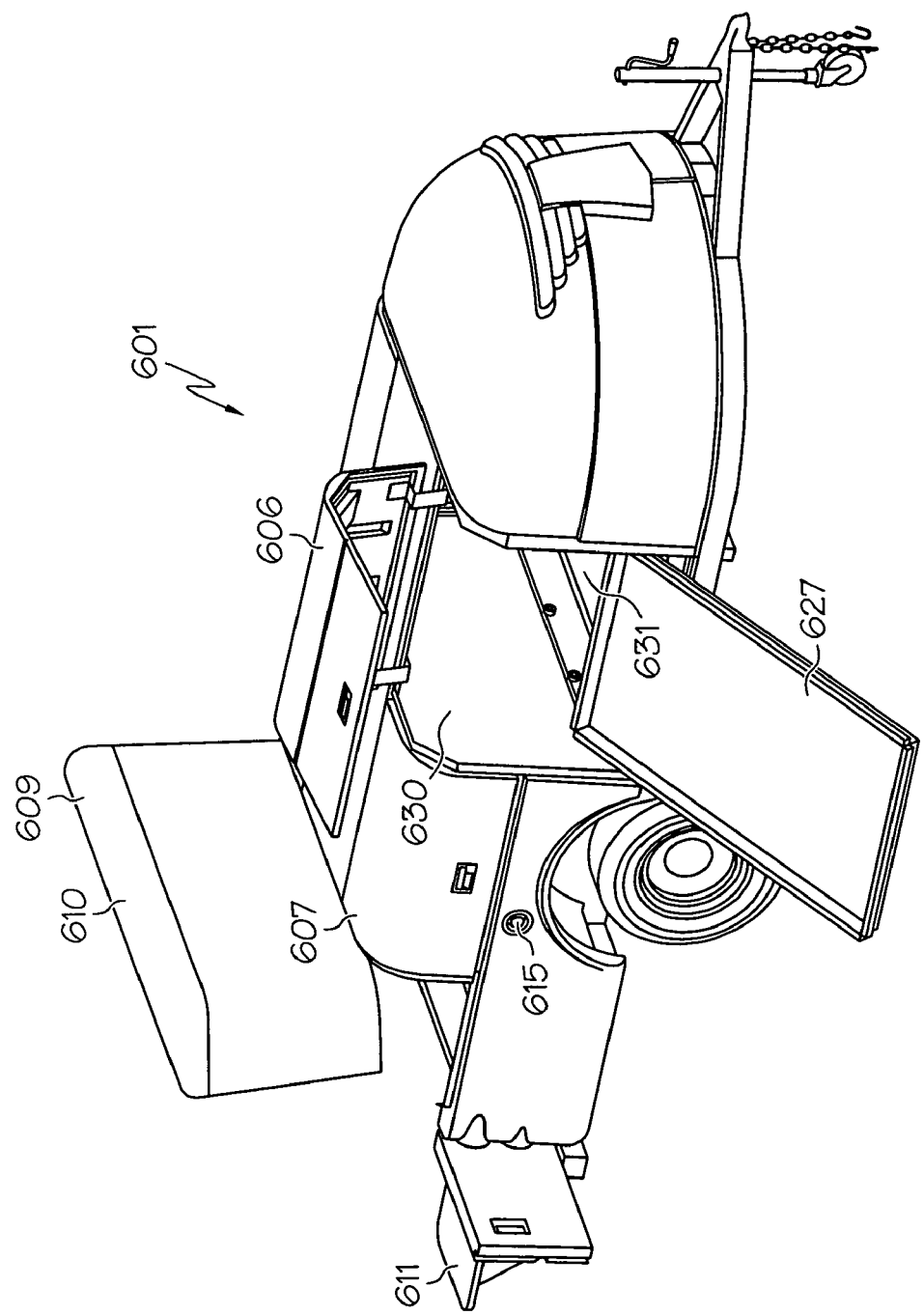
FIG. 6 is an isometric view of the curbside of the recreational trailer or alternatively the incident command post trailer of the present invention showing the raised curbside gull wing door, storage space with tray extending therefrom, raised rear door and tailgate of the invention.

FIG. 6 is an isometric view of the curbside of trailer 601 showing the raised curbside first gull wing 606 door, second door 6-7, raised rear door 610, curbside tailgate 611 and storage space 630 substantially as depicted in FIG. 5 with the exception that FIG. 6 shows removable tray 627 extending from storage space 630 to the ground. If one is carrying heavy bulky items such as the shelter tent which is erected at the rear of the trailer when it is set up for use, the item is stored in the compartment shown and can be easily removed by sliding the tray out and then removing the item therefrom.

Figure 7:
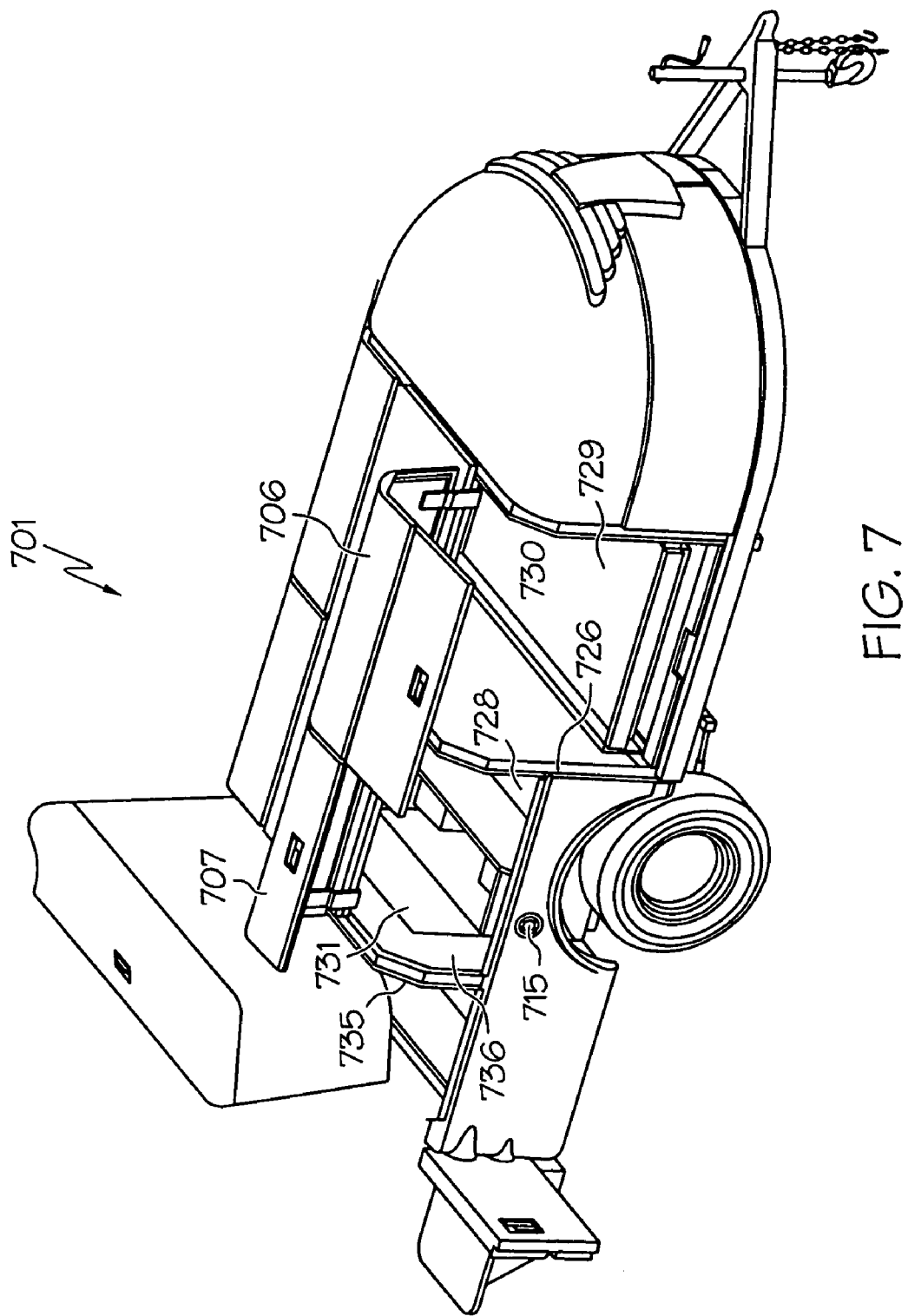
FIG. 7 is an isometric view of the curbside of the showing recreational trailer or alternatively the incident command post trailer of the present invention the first raised curbside gull wing door, storage space with tray extending therefrom, second curbside door second storage space, raised rear door and tailgate of the invention.

FIG. 7 is an isometric top view of the curbside of the trailer generally as depicted in FIG. 6, with the exception that the second curbside door 707 is raised and storage space 731 is accessible from the outside. FIG. 7 further shows the first raised curbside gull wing door 706, storage space 730 with tray 729, empty and in position within trailer 701 and the second curbside door 707, second storage space 731, open and raised, and raised rear door 710 and curbside tailgate 712 of the invention. The space within door 707 contains space for the storage of items used in conjunction with the trailer.

Gull door 707 opens to provide access to a third storage space which has less volume than the adjacent second storage area. The third storage area 745 continuously extends within trailer 701 from curbside to roadside and between the walls 728 and 736 secured to second bulkhead 726 and third bulkhead 735 respectively. Within third storage space 745 defined hereinabove any desired items used in conjunction with the trailer or any other purpose may be stored.

Figure 8:
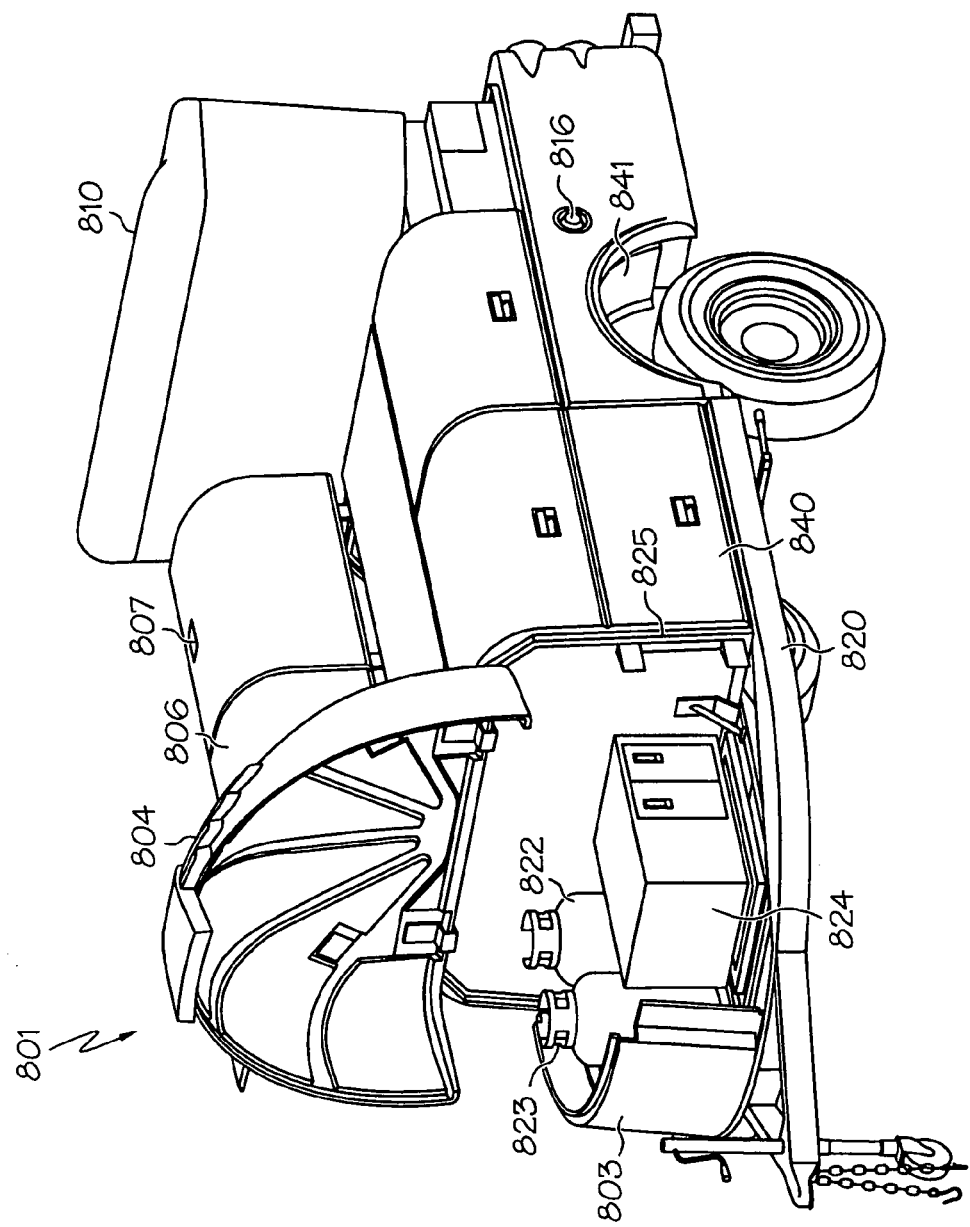
FIG. 8 is an isometric view of the roadside of the recreational trailer or alternatively the incident command post trailer of the present invention showing a raised bonnet, a front panel missing, and the raised rear door of the invention.

FIG. 8 is an isometric view of the roadside of the trailer showing hood 804 in a raised position. A portion of the front panel of front bumper 803 is missing showing A/C generator 824 and compressed gas cylinders 822 and 823 in storage area 820 as described above. The curbside gull wing doors 806 and 807 are raised along with the raised rear door 810 of the trailer. The closed doors 840 and 841 on the road-side of the vehicle enclose open storage spaces (not shown) in trailer 801 that extends continuously from roadside doors 840 and 841 to curbside doors 806 and 807 respectively and within the first 825, second 826 (not shown) and third 835 (not shown) bulkheads and walls affixed thereto.

FIG. 9 is an isometric view showing the rear of the trailer with raised rear door 910 and curbside 911 and roadside tailgates 912 opened outward. The view shown is directed to the recreational camper embodiment. For the convenience of the users, the rear of the trailer is outfitted with all a refrigerator 950, a sink 951 with water faucet 952, stove 953, electrical A/C outlets and counter space 954 and 955 in the form of the surface provided by the tailgates. The rear door also possesses gas springs 965 and 966 to ease opening and closing same.

Figure 9A:
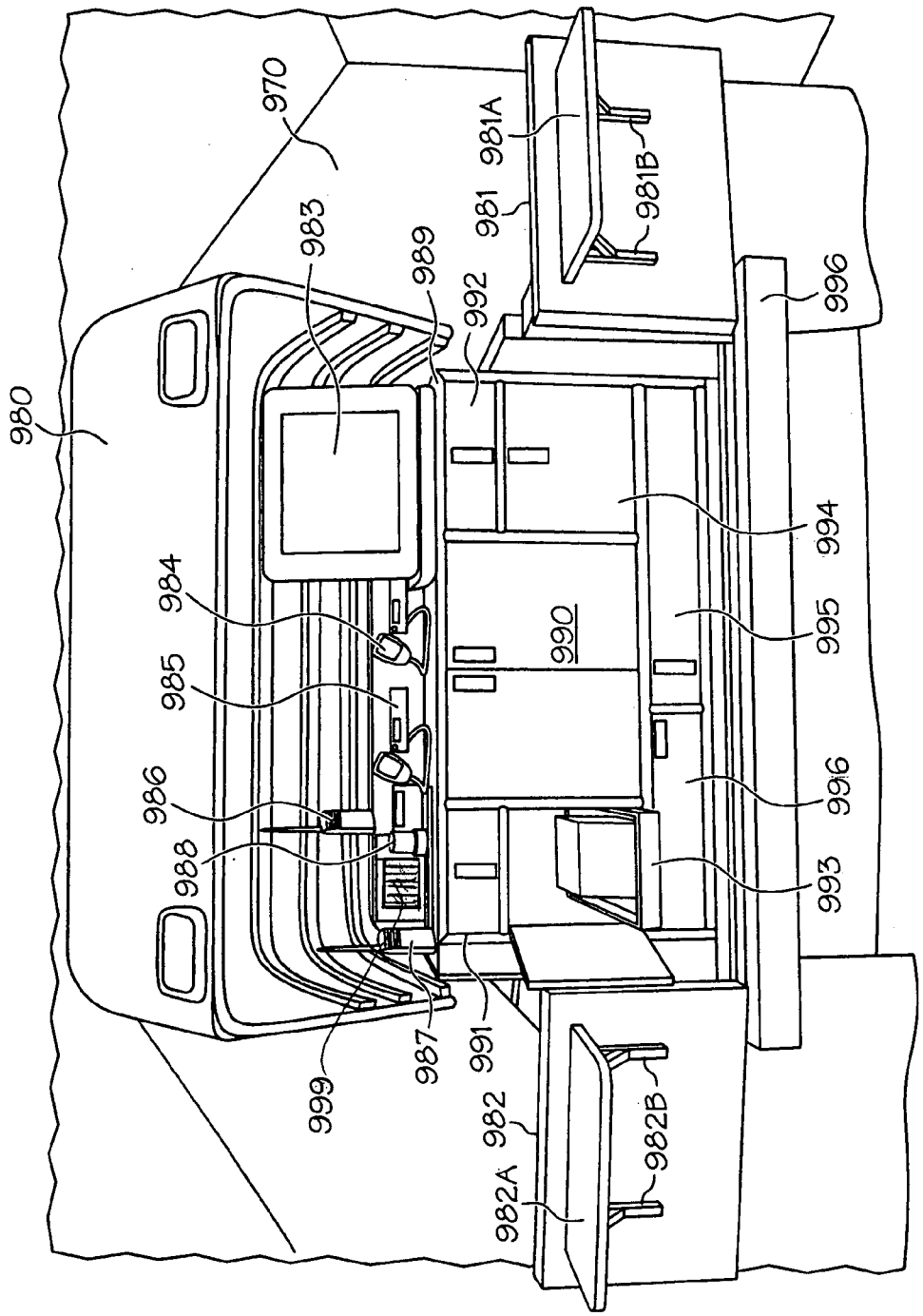
FIG. 9A is a view of the rear of the incident command post trailer of the present invention showing the rear with raised rear door and depicting the electronic communication equipment used therewith.

FIG. 9A depicts a view directed to the incident command post. This embodiment is a view showing the rear of the trailer within the confines of shelter 970 with raised rear door 980 and curbside tailgate 981 and roadside tailgate 982 opened outward. The tailgates each have hinged foldable collapsible trays 981A and 982A which provide a work surface for any desired purpose. These trays are hingedly secured to the interior of the rear doors and the underside of the trays and they fold down 90° flush with the tailgates when the tailgates are closed.

The upper counter depicted at the rear of the trailer is outfitted with a computer monitor 983, CB radio communication units 984 and 985, hand held radio communication units 986 and 987 and 988. Console cabinet 989 possesses a double door storage cabinet 990 which is flanked by storage drawers 991 and 992. Directly beneath drawers 991 and 992 there are storage cabinets 993 and 994. Cabinet door 993 is open showing a tray containing a box of supplies therein. The rear door possesses gas springs (not shown) to ease opening and closing same. Storage compartments 995 and 996 are position laterally to each other immediately below storage cabinets 993 and 994.

In addition, vent opening 999 in the vertical portion of the instrument panel console serves as a duct through the console to allow air conditioned cool air to circulate within the shelter when it has been set up attached to the trailer. Another air conditioning duct (not shown) is positioned in the console but is obscured from view as it is positioned behind monitor 983.

Figure 10:
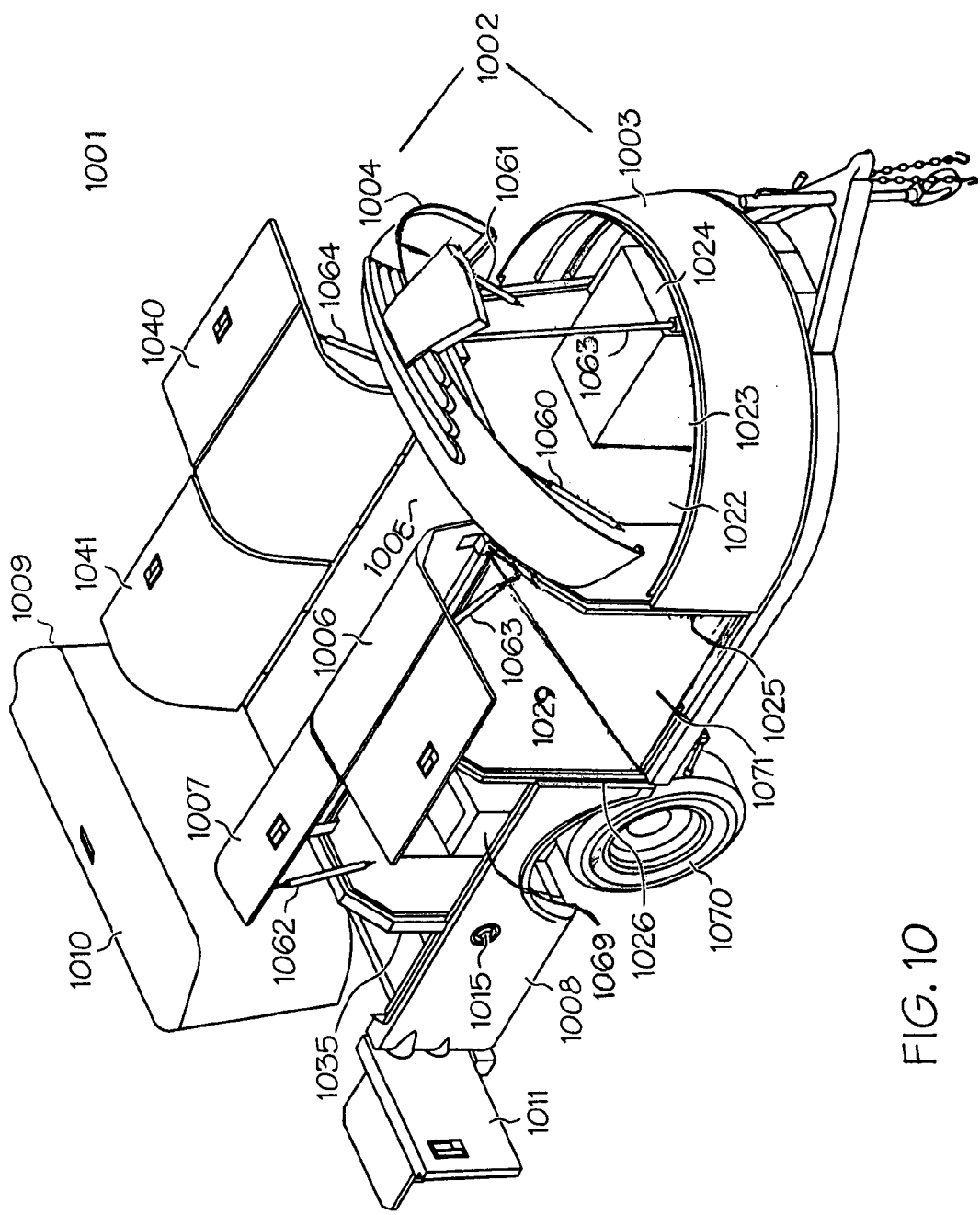
FIG. 10 is an isometric top view of the recreational trailer or alternatively the incident command post trailer of the present invention showing all of the doors of the invention in a raised position.

FIG. 10 is an isometric curbside top view of the trailer showing all of the doors of the trailer of the instant invention in a raised position. From front to back, FIG. 10 shows trailer 1001 has front section 1002 comprising front bumper section 1003 and hood section 1004. The raised hood is raised easily as a result of a pair of gas springs 1060 and 1061 and is held in pace by prop rod 1063.

Behind front section 1002 on the curbside of the trailer curbside gull wing doors 1006 and 1007 are in a raised position. Road side gull wing doors 1040 and 1041 are also raised. The roadside and curbside gull wing doors are secured to top 1005. Within the space enclosed by curbside gull wing door 1006 is storage space 1029. Door gas springs 1062 and 1063 are affixed from the interior chassis of the trailer to gull wing doors 1007 and 1006 respectively. Curbside wheel panel 1008 is located immediately below curbside door 1007. The rear door 1010 of the trailer with trailing edge 1009 is in a raised position and tailgate 1011 is in the fully open position.

FIG. 10 depicts the framework bulkheads 1025, 1026 and 1035. Fixed to each of the bulkheads noted is a wall which separates the trailer interior into 4 distinct storage areas. Pneumatic tire 1070 is equipped to travel over the roughest and demanding terrain. The floor 1071, shown in storage space 1029, extends continuously along the entire length and width of the trailer, within the interior of the trailer, and is sturdy enough to support the heavy loads that are transported in the trailer.

An 18,000 BTU/HR air-conditioning unit 1024 is positioned in the front storage area of the ICP trailer. This unit directs cool air through the ducts in the console at the rear of the trailer into the assembled shelter.

A 6500 watt a/c generator 1069 supplies electricity to run air-conditioning unit 1024 and provides power for the electronic equipment at the command post at the rear of the vehicle.

The hitching system described in FIG. 1 is present as described above. The trailer depicted in FIG. 10 is as it appears when it is being set up for use. The items suitable for storage in the spaces provided are not shown.

The doors on the trailer depicted in FIG. 10 and described herein are connected to either the top element of the trailer or to a bulkhead (depending upon their location) by means of a piano or continuous type hinge so that the doors can easily opened and closed. All of the doors on the trailer also have door gas springs to provide the "manual closing torque" required to open and close the doors, hood etc. thereby easing the effort needed to open or close the doors, hood etc.

It has been experimentally established that the streamlined profile of the trailer of the present invention is aerodynamically efficient and has less drag associated with its surface than a bluff body, i.e., a body having a broad, flattened front, found in the prior art.

As noted above, the camper trailer of the present invention has an improved aerodynamic configuration which is designed to reduce drag. In order to establish the credibility of the assertion of reduced drag and more efficient gas mileage, a test was conducted to establish conclusively that the camper trailer was aerodynamically efficient. The following test procedures were used to support the assertion.

A fuel consumption comparison test of the model travel trailer of the present invention (referred to for the sake of the test description as the CAMP/ICP trailer) with an R-Vision Crossover model travel trailer.

The purpose of this testing was to compare the fuel economy between the recreational trailer of the CAMP/ICP trailer and the R-Vision Crossover model travel trailer noted above.

Test Procedure:

Each trailer test unit was subjected to one test segment. A 30-mile warm-up run at 55-mph steady state was performed on all test units prior to running the test segments. A test segment consisted three 30-mile runs at 55-mph steady state. An additional test segment consisting of three 30-mile runs at 55-mph steady state was performed on the tow vehicle alone with no trailer attached to it.

Test Results:

On day one, the tow vehicle and R-Vision Crossover trailer averaged 2.869 gallons of fuel used during the three 30-mile runs at 55-mph steady state for an average of 10.582 miles per gallon.

On day two, the tow vehicle and the CAMP/ICP trailer with its aerodynamic shape averaged 1.897 gallons of fuel used during the three 30-mile runs at 55-mph steady state for an average of 15.839 miles per gallon.

On day two, the tow vehicle averaged 1.503 gallons of fuel used during the three 30-mile runs at 55-mph steady state for an average of 19.990 miles per gallon.

Data Information:

| Day One | | | |
|---|---|---|---|
| Tow With R-Vision Rental | Run #1 | Run #2 | Run #3 |
| Run Time | 32.565 | 32.752 | 32.660 |
| Fuel Consumed | 2.886 | 2.856 | 2.865 |
| Distance | 30.510 | 30.524 | 30.042 |
| MPG | 10.572 | 10.689 | 10.485 |
| Average MPG: | 10.582 | | |
| Average Fuel Consumed: | 2.869 | | |

| Day Two | | | |
|---|---|---|---|
| Tow With CAMP/ICP Trailer | Run #1 | Run #2 | Run #3 |
| Run Time | 32.565 | 32.572 | 32.612 |
| Fuel Consumed | 1.920 | 1.886 | 1.884 |
| Distance | 30.023 | 30.035 | 30.069 |
| MPG | 15.637 | 15.922 | 15.957 |
| Average MPG: | 15.839 | | |
| Average Fuel Consumed: | 1.897 | | |

| Day Two | | | |
|---|---|---|---|
| Tow Vehicle Only | Run #1 | Run #2 | Run #3 |
| Run Time | 32.572 | 32.572 | 32.478 |
| Fuel Consumed | 1.525 | 1.491 | 1.492 |
| Distance | 30.050 | 30.031 | 30.019 |
| MPG | 19.710 | 20.142 | 20.118 |
| Average MPG: | 19.990 | | |
| Average Fuel Consumed: | 1.503 | | |

To provide a proper basis for comparison, the test conditions were standardized. As to the vehicles used in the testing procedure, the tow vehicle and trailers were inspected and prepared prior to conducting the test. The changes made to the tow vehicle included: installing fuel flow meter, re-plumbing fuel lines, installing Somat EDAQ unit and V-box. The air conditioning, fan, and electrical output were set to the same settings on the tow vehicle for each test run. Tire pressures for the invention trailer were adjusted to 33 psi. for all test runs. Tire pressures for the R-Vision Crossover trailer were adjusted to 42 psi. for all test runs. Tire pressures for the tow vehicle were adjusted to 75 psi. for all test runs.

A GPS and a digital read-out display were installed to assure proper speeds during testing. Fuel lines were connected to the vehicle fuel system to plumb in the fuel flow meter.

The tow vehicle and CAMP/ICP trailer actual axle weights were recorded: Steer Axle: 3500 lbs. Drive Axle: 3270 lbs. Trailer Axle: 2570 lbs. Total: 9340 lbs. The tow vehicle and R-Vision Crossover trailer actual axle weights were recorded: Steer Axle: 3540 lbs. Drive Axle: 3180 lbs. Trailer Axle: 2420 lbs. Total: 9140 lbs.

The ambient temperature ranged from 56° F. to 76° F. Wind speeds were from 0 MPH to 8.8 MPH with gusts up to 18.8 MPH during the tests as recorded by the BAPG weather station computer.

The detailed vehicle information used in the test is as follows:

Tow Vehicle
Chassis Manufacturer: General Motors
Manufacturer Date: January 2008
Engine: 6.0 L V-8
Transmission: 6 speed Automatic
Front Axle Tire Manufacturer and Size: Bridgestone LT245/75R16
Rear Axle Tire Manufacturer and Size: Bridgestone LT245/75R16
Front Axle Tire Air Pressure Adjusted To: 75 PSI
Rear Axle Tire Air Pressure Adjusted To: 75 PSI
Wheel Base: 159"
Overall Width: 80"
Overall Height: 76"
Curb Axle Weight: Front Axle: 3710 LBS Rear Axle: 2830 LBS Total: 6540 LBS
CAMP/ICP RVT Trailer Information
Trailer Make: CAMP/ICP RVT Trailer
Trailer Model Civilian Model
Trailer Front Axle Tire Manufacturer and Size: B.F. Goodrich 31×10.50 R15 LT
Trailer Front Axle Tire Air Pressure Adjusted To: 33 PSI
Trailer Wheel Base: Single Axle
Trailer Overall Width: 72.50"
Trailer Overall Height: 60"
Curb Axle Weight: Tongue: 512.5 LBS Trailer Axle: 2517 LBS Total: 3080.5 LBS
Loaded Axle Weight: Steer Axle: 3500 LBS Drive Axle: 3270 LBS Trailer Axle: 2570 LBS
Total: 9340 LBS
Rental R-Vision Crossover Trailer Information
Trailer Make: R-Vision
Trailer Model Trail-lite
Trailer Front Axle Tire Manufacturer and Size: Duro ST205/75D14
Trailer Front Axle Tire Air Pressure Adjusted To: 42 PSI
Trailer Wheel Base: Single Axle
Trailer Overall Width: 91"
Trailer Overall Height: 124"
Curb Axle Weight: Tongue: 375 LBS Trailer Axle: 2375 LBS Total: 2750 LBS
Loaded Axle Weight: Steer Axle: 3540 LBS Drive Axle: 3180 LBS Trailer Axle: 2420 LBS
Total: 9140 LBS.

The data set forth above shows that the "prior art" trailer used almost twice the amount of gasoline over the same course route as the tow vehicle with no trailer attached. Surprisingly, the trailer (the CAMP/ICP trailer) of the present invention used only 1.2 times the amount of gasoline over the same course route as the tow vehicle with no trailer attached. In comparing the trailers, the prior art trailer used 1.5 times the amount of gasoline in gallons as the streamlined CAMP/ICP trailer of the present invention over the same course route.

The specific construction of the shelters used in combination with the trailer of the instant invention is disclosed in U.S. Pat. Nos. 5,797,695, 7,481,235, 7,546,845, U.S. patent application Ser. No. 12/322,062, filed Jan. 27, 2009, all to A. Jon Prusmack, the contents of which patents and application are hereby incorporated by reference herein.

The shelters used herein are collapsible, self supporting structures that are formed from a plurality of interconnected substantially square matrixes, each of which is referred to as a "quad." Each square quad contains a plurality of pairs of exterior and interior articulating hub assemblies which serve as connectors among pairs of crossed, pivotally-connected struts (tubular rod elements). The pairs of struts referred to above form the top, bottom and the sides of the quad, and a sub-assembly within said periphery of said quad having four pairs of crossing diagonal struts connected to a pair of articulating hub assemblies at each apex of said quad periphery and to a pair of hub assemblies in the center thereof. When one or a plurality of quads are used to form an arch, the quads are disposed in an elevated substantially arcuate form in which adjacent quads share common end-defining pairs of crossed, pivotally connected struts.

The preferred embodiment shelter structures are formed by securing the aforementioned quads together end to end, i.e., base to top, to form a connected elevated sequence of quads in a row referred to as "an arch." The shelter structures of the present invention are three dimensional. The shelter has dimensions along the X, Y and Z Cartesian axes. The X and Y axes are two dimensional. The X and Y axes are coplanar and refer to (X) the width between the first quad in an arch and the last quad in said arch and (Y) the height of the shelter, respectively. (See FIG. 16 for a depiction of the width [01 to 06] and the height [01 to 03 and 06 to 04]) The shelter also has a third dimension, i.e., the Z dimension, which defines the depth of the shelter, the "depth" referring to how many arches are connected side to side. Thus, the depth of the shelter is a function of the number of arches of quads placed side by side. The preferred embodiments of shelters used in combination with the trailer of the present invention has 2, 3 or 4 arches of quads placed side by side in the Z axis.

Placing a given number of arches adjacent one another creates a sequence of quads extending normal to the arch row, in which each side by side quad in the sequence along the Z axis is referred to as a "column."

The portable shelters used in combination with the trailer are made up of two types of quads which are connected together in various combinations to create the raised arch. The number and type of quads used depends upon the interior space desired in the resulting shelter. The two types of quads used in the shelter are designated and referred to hereinafter as "A" and "B" quads. The A and B quads differ from each other depending upon the ratio of the length of the struts to one another used therein and the positioning of scissor points which is the location along the length of the struts where each pair of struts are connected to each other, allowing the struts to articulate.

The A quad is symmetrical since it has a square configuration with struts having scissor points joined mid-way along the length of the contiguous struts, i.e., equidistant from each end of the stut. The A quad provides only height in the vertical axis and width in the horizontal axis when installed in combination with the B quads in the arch(es) forming a shelter. The "A" quad has a subassembly contained within the area defined by the top, base and sides thereof. The subassembly has a pair of center hubs comprising an exterior center hub and an interior center hub positioned substantially in-line substantially in the center of said quad with respect to each other, wherein four sets of two tubular struts each extend from said center hubs to said top and said base hubs. See FIG. 20 for a depiction of the arrangement of the subassembly having A and B quads.

The B quad has the same overall dimensions as the A quad but the struts scissor points are joined off-center along the length of the contiguous struts. Thus the scissor points of the struts of the B quads are asymmetrical and are positioned at unequal distances from the ends. This design allows one end to form a zero degree plane and the other end to form an angular plane to match the number of isosceles triangles necessary to create a completed arch. The B quads provide the arcuate form to the shelter when used alone or in combination with the A quads. Subject to the storage capability of the trailer, the shelters used in accordance with the present invention contain from 4 to 7 or more A and B quad arrangements to form the structure.

A quad comprises interconnected sets of hubs and sets of struts that form its perimeter. There are in addition, four sets of two cross member struts, each set secured at "scissor points" and situated within the interior confines of the perimeter of a quad. This portion of the quad is called a "sub-assembly." Each of the set of struts in the sub-assembly is connected to one of the set of four corner perimeter hubs at one end, and to the two central hubs within each A and/or B quad at the other end. The struts within the sub-assembly bisect each apex corner thereof at 45°. These sub-assemblies are used for enhanced stability and provide a center support section for both exterior and interior covers used with the shelter. The center hub receives a mushroom shaped keeper that attaches the exterior and interior cover surfaces to the articulating hub assembly.

The scissor points mentioned above play an essential role in expanding and contracting the shelter. The A quad has the scissor point located at the center of the strut lengths. The A quad only defines 0 and 90 degree planes. The B Quad has off-center scissor point along the length of the strut. The B quad is configured to define arches in multiple apex angles when connected. If all B quads were connected together or a combination of A and B quads connected together, the end result would be a circle.

A fixed dimension between A and B quad struts must be maintained in order for the struts to articulate. The sum of the distances between scissor points on the struts to the articulating hubs for both A and B quads must be equal.

Figure 20:
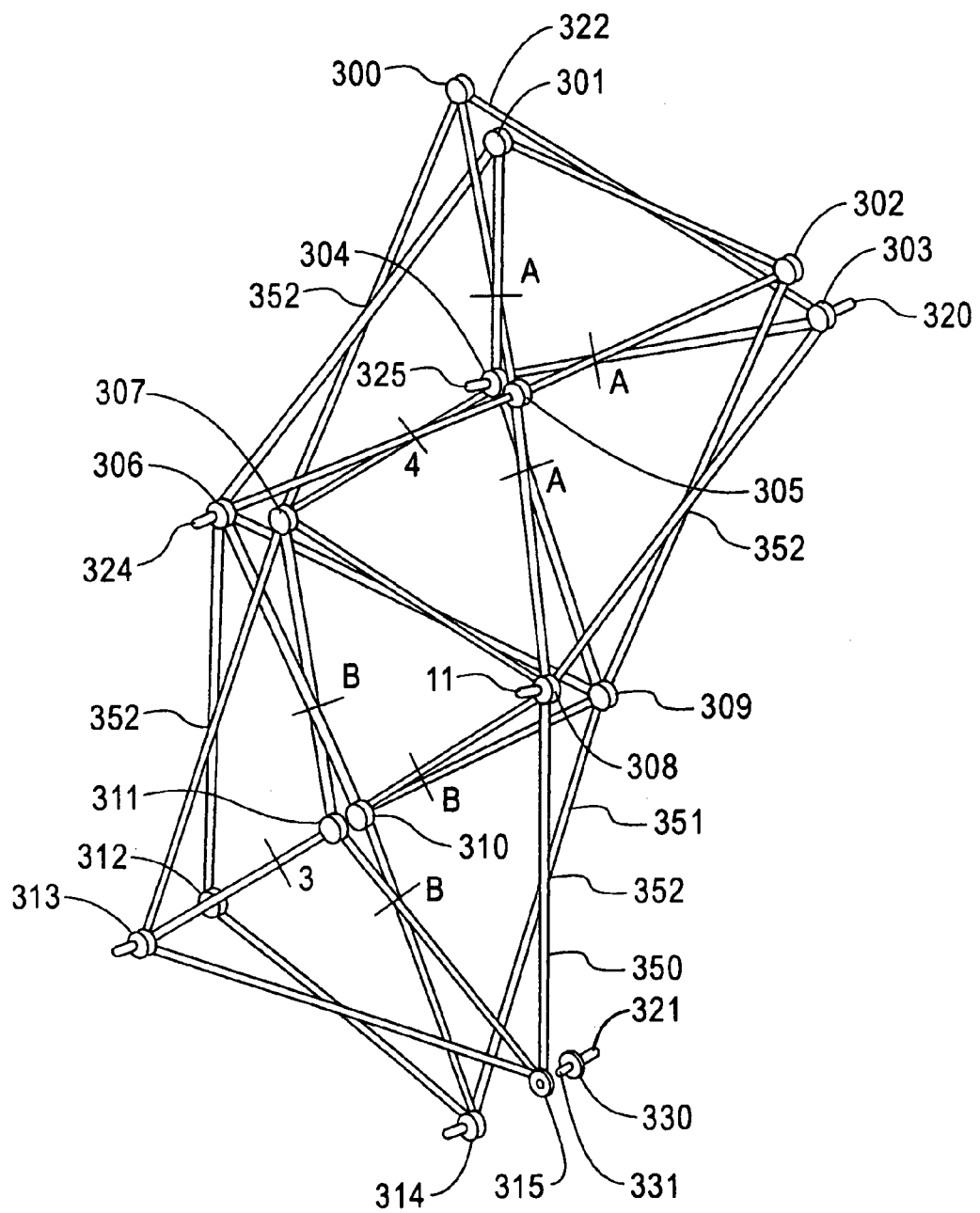
FIG. 20 depicts an oblique closeup view of an A quad and a B quad used to form the arcuate structure of the present invention.

FIG. 20 depicts an oblique closeup view of two of the seven quads used to form the arcuate form noted above showing the hubs and struts in their deployed positions. In the assembled shelter there is a plurality of articulating hub assemblies connected to tubular struts. Each quad possesses 8 articulating hub assemblies, wherein some of the articulating hub assemblies located at an end of the quad may be shared by the quad(s) located contiguous therewith. There are 4 sets of tubular struts, each set having a single flexible pivot or scissor point and a total of 8 diagonal struts wherein each two diagonal struts are connected to an articulating hub assembly in the center of the quad.

FIG. 20, depicts the "A" shelter as the top quad of the two quad structure with the "B" quad beneath interconnected via shared articulating hubs, 306, 307, 308, 309 which quad "A" and quad "B" share. The arrangement depicted in FIG. 20 provides a detailed view e.g. of a BAB shelter obviously with a "B" quad missing. FIG. 20, depicting the arrangement of an "A" quad and a "B" quad is for illustrative purposes only and serves to detail the various struts and hubs and how the scissor points differ between the "A" and "B" quads. There are examples set forth hereinafter wherein the positions of the quads are reversed wherein the "A" quad is on the bottom or on contact with the planar surface (i.e. the ground or surface whereupon the shelter is struck) and the "B" quad is attached to the "A" quad via the exterior and interior articulating hubs which the "A" quad shares with the "B" quad.

FIG. 20 is an isometric view of an A quad connected to a B quad as typically found in an arch which comprises a deployable shelter, showing a plurality of articulating A quad hub assemblies 300 to 309 connected to tubular struts together forming the matrix upon which the fabric cover 700 (not shown rests and to which it is secured. From the perspective of fabric 700 (not shown) which will cover the skeletal matrix, the A hub assemblies as shown has internal loop 320.

The A and B quads noted each contain a subassembly contained within the area defined by the top, base and sides thereof. The A subassembly has a pair of center hubs 604, 605 comprising an exterior center hub 304 and an interior center hub 305 positioned substantially in-line substantially in the center of said quad with respect to each other, wherein four sets of two tubular struts each extend from said center hubs to said top and said base hubs. The scissor points 352 of the A quad in the preferred embodiment is in the center of the struts, so FIG. 20 is not necessarily drawn to scale.

Referring again to FIG. 20, the B subassembly has a pair of center hubs 310, 311 comprising an exterior center hub 311 and an interior center hub 310 positioned substantially in-line substantially in the center of said quad with respect to each other, wherein four sets of two tubular struts each extend from said center hubs to the top and base hubs. The scissor points 352 of the B quad are positioned off-center along the length of the struts in the preferred embodiment is in the center of the struts so FIG. 20 is not necessarily drawn to scale.

Hubs 306, 307, 308 and 309 are examples of "shared hubs in that they serve functional purposes for both the A quad and the B quad. The term "shared hub" refers to an articulating hub (or hubs) whether exterior or interior, which secures struts forming the network of contiguous quads (See articulating hubs 306, 307, 308 and 309. The shared hub serves as a joint hub, for the sake of discussion, in the front or top end of one quad and the back or bottom end of another quad as well as receiving struts therein from quads forming arched rows which are adjacent to the hub. The shared hubs can rotate 180° about its vertical axis to allow the shelter to expand from collapsed to erected form.

The shared hubs can rotate 180° about its vertical axis to allow the shelter to expand from collapsed to erected form.

If for example, one were to desire to construct a large volume shelter having 7 quads, the shelter can take the form of ABBABBA; BBBBBBB; and BBBABBB. In the form options noted, the quads are connected together end to end, the resulting framework is curved forming an arcuate shape. "Arcuate" shape as used herein refers to the curvature of the front profile of the shelter (See FIG. 16) which is a gradual rounded slope rising from ground level (in the case of a B quad as the first quad, or from the top end of an A quad) up to a maximum point or plane (depending on whether an A or B quad is in the center of the structure) followed by a gradual descending downward slope to the ground or to the top end of an A quad. The use of the B quad effectively creates an arch that mimics a semi-circle and transition from vertical to horizontal planes.

The A and B quads, are structural elements that when connected form a vertical or a horizontal plane element via an A quad, and/or a curved arch via a B quad. Thus, only the B quads provide arcuate inclination on both sides of the center of the structure. The quads can be any size desired depending upon the length of struts and the ratio of these lengths plus the positioning of the scissor point allowing the struts to articulate.

As a result of the construction of and the cooperation between the A and B quads and the articulating hub assemblies, the shelter framework is movable between a collapsed bundled condition in which the struts are disposed in generally parallel relation to an expanded condition in which the quads and framework are disposed in three dimensional form. The quads are so arranged that a horizontally disposed top central region of the framework is at least partially bounded by quads extending in different directions therefrom and which effect a transition angularly from the horizontal disposition of the top region to vertically disposed quads of the assembly at the sides, i.e., horizontal to vertical subtends an angle of 90°.

The basic, indispensable element comprising the portable shelter is the hub which connects the struts which struts in turn form the skeleton structure of the shelter. Without a properly designed hub connecting the struts, the struts cannot effectively rotate through a 180° axis and the shelter cannot be easily erected or collapsed.

The appropriate diameter of the hub of the present invention is a function of the size of the deployable structure to be assembled. The effective hubs used in conjunction with the strut assemblies are of different size depending upon the dimension of the shelter in which they are used. The hub for the shelters for example with seven quads, has an octagonal shape which allows larger diameter tubular struts of 1 inch or greater which struts are fixed in slots in the hub to rotate when erecting or collapsing the structure.

Figure 17:
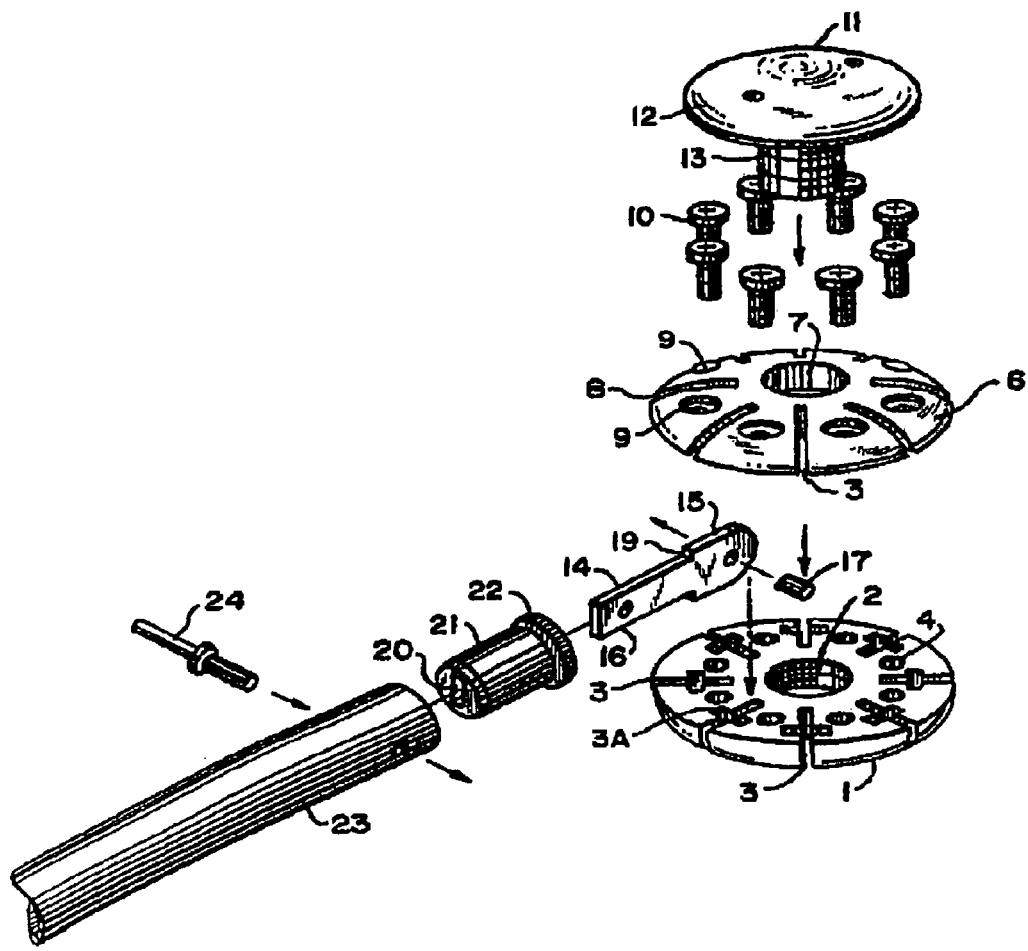
FIG. 17 is an exploded perspective view of the articulating hub assembly components used in the present invention.

The components comprising the articulating hub assembly used in the shelter of the present invention which is the preferred embodiment hub is depicted in FIG. 17, and is described in U.S. Pat. No. 5,797,695 ('695) to A. Jon Prusmack, the contents of which are hereby incorporated by reference herein.

Referring to FIG. 17, hub body 1 is a disc like unit having a central opening 2 therethrough and a series of radial slots 3 extending inwardly from the periphery of disc 1 and having a series of openings 4 extending through disc 1 and positioned radially between each of the radial slots 3 and between periphery 5 and central opening 2. A groove 3A is located perpendicular to each of radial slots 3.

Hub cover 6 is similarly formed with central opening 7 and radial slots 8 and openings 9. The hub body 1 and hub cover 6 are assembled contiguously so that central openings 2 and 7, radial slots 3 and 8 and openings 4 and 9 are in registry. Hub cover 6 is secured to hub body 1 via screws 10. Hub cover 6 does not require grooves wherein the roll pins will rest. Keeper 11 is a mushroom shaped element wherein top 12 is contoured to match the contoured slope of the exposed surface of hub cover 6 and the shaft 13 of keeper 11 is threaded to coincide with the thread present in central openings 4 and 9 and possesses the same diameter as those openings to allow it to be threadedly engaged therein.

Figure 18:
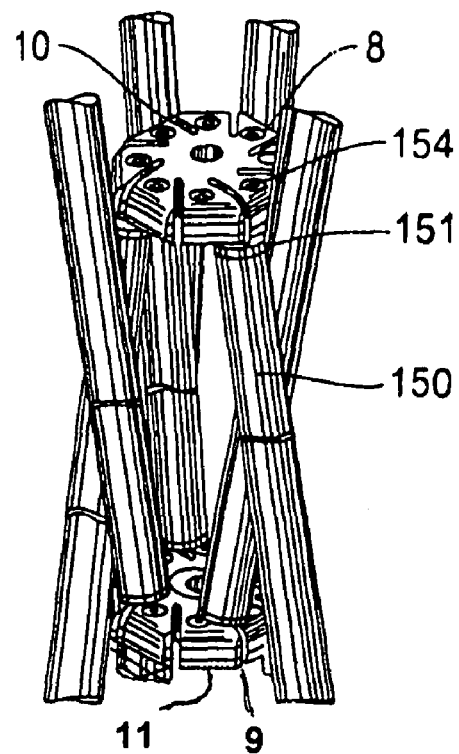
FIG. 18 is an oblique view of hubs and tubular struts as they appear when the deployable shelter is in a folded state.

FIG. 18 depicts another embodiment of an articulating hub used with struts larger in diameter than those used in the shelter strut 23 depicted in FIG. 17. FIG. 18 depicts tubular struts 150 and two octagonally shaped hubs 8 and 9, with the tubular struts in their intermeshed orientations when the structure is in a folded state. This type hub and others are described in U.S. Pat. No. 7,481,235 to A. Jon Prusmack, the contents of which are hereby incorporated by reference herein. When viewing the hubs as depicted in FIG. 18, the "bottom" element, 10, of hub assembly 8, is shown connected to four tubular struts, and the "top" element, 11, of hub assembly 9 is shown also connected to four tubular struts. The tubular struts are connected to the hub by means of a plug 151 affixed within the interior of tubular strut 150. Plug 151 is connected to tang 154 which is held within the hub body 8. FIG. 18 shows only 7 struts for clarity.

Figure 19:
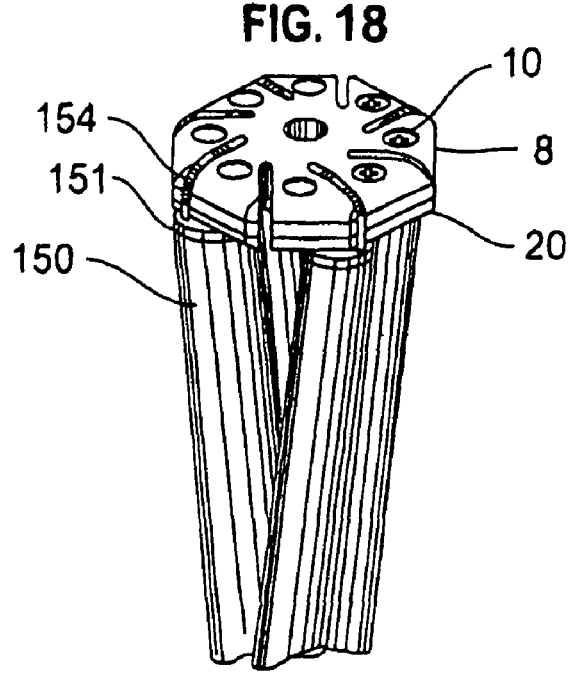
FIG. 19 is an oblique view of a portion of the structure depicted in FIG. 18.

FIG. 19 shows the "bottom" 10 of assembly 8 of the present invention, with four tubular struts 150 in heir folded and intermeshed positions. Similar to FIG. 18, the tubular struts 150 are fastened to plug 151 which is, in turn, fastened to tang 154 which is captured within hub body 8.

For reasons discussed in greater detail below, the struts used with the hubs depicted in FIGS. 18 and 19 are larger in diameter than those used in the shelter depicted in FIG. 17. The slots in the octagonal shaped hub shown in FIGS. 18 and 19 which secure the tubular struts into the hub are offset at a 45° angle so that the larger diameter struts easily fold in on themselves and provide a compact bundle for storage in the trailer or expand easily for a quick set-up.

Another feature of the articulating hub assemblies described herein, is the ability to secure fabric covers (covering the tubular frame network) to the hub body and allow the two covers (interior and exterior) to move simultaneously with the tubular frame. A mushroom shaped threaded "keeper" component is inserted through an opening in the hub to secure the fabric cover thereto (See, e.g., FIG. 17, element 11).

Figure 16:
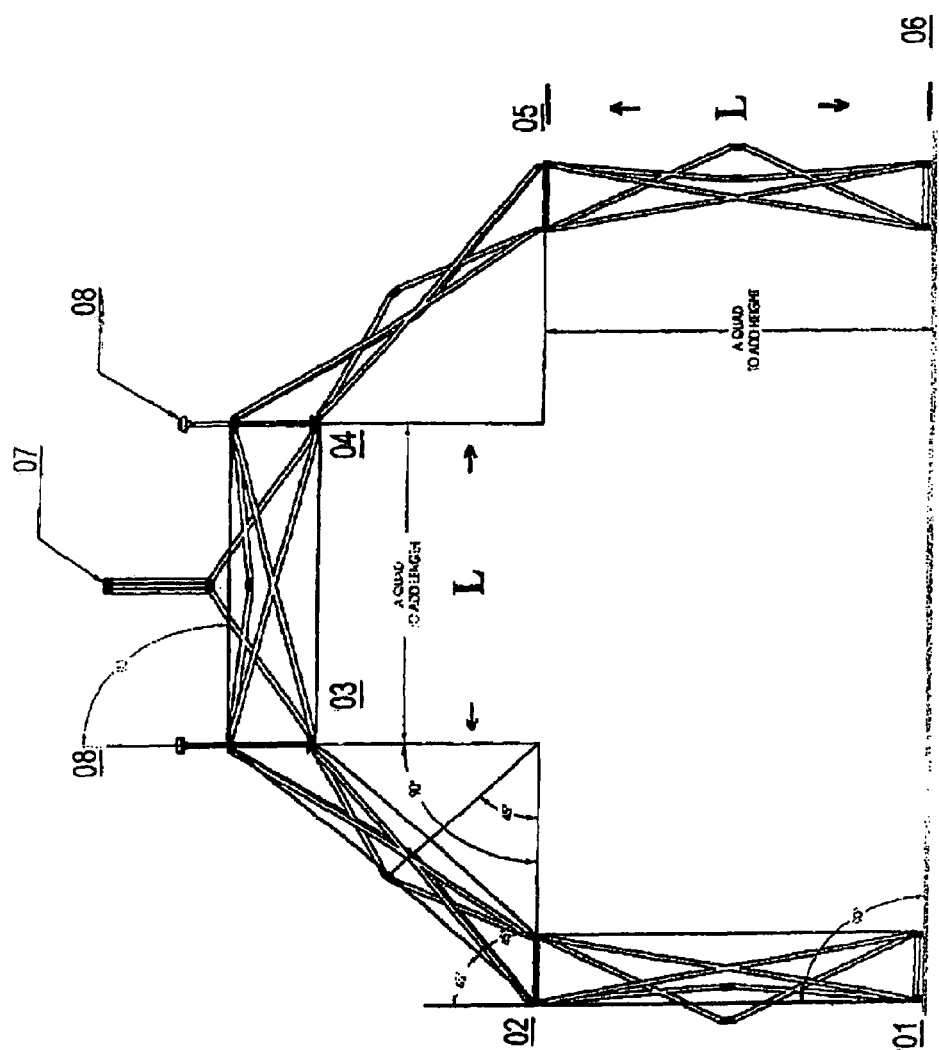
FIG. 16 is a cross sectional view of the shelter which is the preferred embodiment having five quads comprising ABABA in sequence.

The preferred embodiment shelters of the present invention comprise five quads which form an arch of the structure. There are three preferred separate shelters which are used with the trailer denoted as "small," "medium" and "large" shelters. The small shelter has two arches deep (Z axis) of five quads each; the medium shelter has three arches deep (Z axis) of five quads each; and the large shelter has four arches deep (Z axis) of five quads each. FIG. 16 depicts a shelter having the five quads denoted ABABA. In the small, medium and large shelters, there are one, two or three additional arches respectively contiguously located behind the shelter depicted in the drawing.

Figure 11:
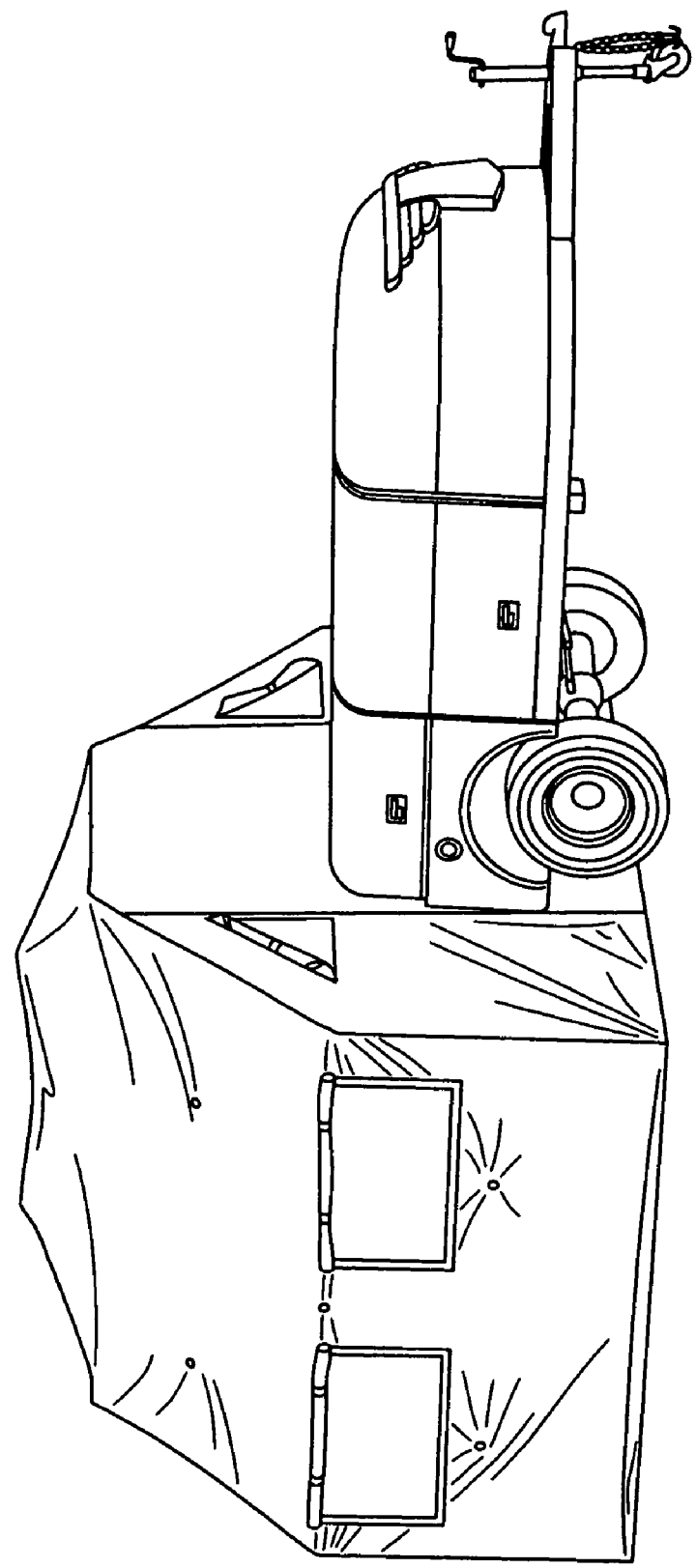
FIG. 11 is an isometric view of the recreational trailer or alternatively the incident command post trailer of the present invention in combination with a small shelter of the invention.

FIG. 11 is a side-view of the trailer in combination with a small quick erect/strike shelter designed to accommodate 4 persons. The small shelter has a specially fitting front end wall that has a central opening that fits around the rear end of the trailer, thus allowing access from the interior of the shelter to the appliances or command post which are located at the rear of the trailer. There are two windows in the front end wall of the shelter which allow light to enter the interior from the front of the shelter. The shelter has a total of 4 side windows (2 on each side, i.e., two per arch on each side of the center quad of the shelter) to provide sufficient available light during the daytime. The small trailer has a preferred interior area of just over about 107 ft$^2$. The back end of the small shelter has an entrance/exit consisting of a roll-up fabric doorway to allow ingress/egress to the shelter.

Figure 12:
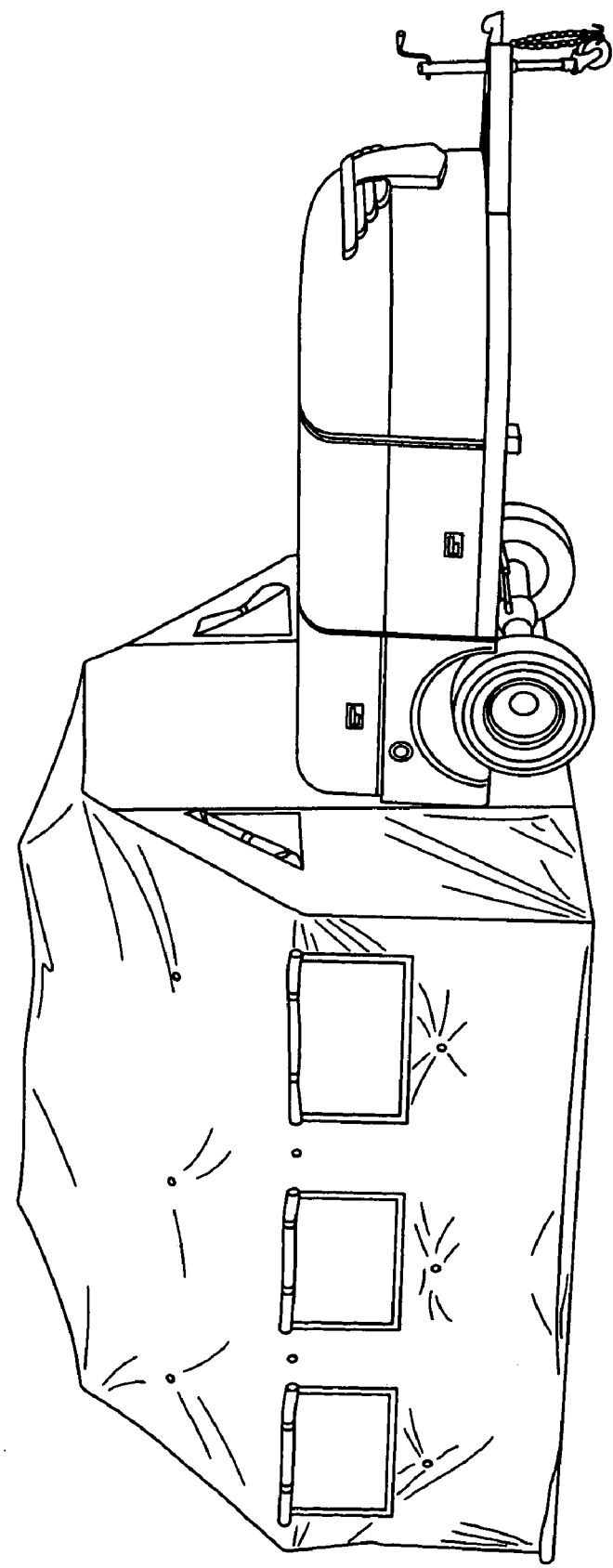
FIG. 12 is an isometric view of the recreational trailer or alternatively the incident command post trailer of the present invention in combination with a medium shelter of the invention.

FIG. 12 is a side-view of the trailer in combination with a medium quick erect/strike shelter designed to accommodate 6 persons. The medium shelter has a specially fitting front end wall that has an central opening that fits around the rear end of the trailer, thus allowing access from the interior of the shelter to the appliances or command post which are located at the rear of the trailer. There are two windows in the front end wall of the shelter which allow light to enter the interior from the front of the shelter. The shelter has 6 side windows (3 on each side, i.e., two per arch on each side of the center quad of the shelter) to provide sufficient available light during the daytime. The medium trailer has a preferred interior area of just over about 161 ft$^2$. The back end of the medium shelter also has an entrance/exit consisting of a roll-up fabric doorway to allow ingress/egress to the shelter.

FIG. 13 is a side-view of the trailer in combination with a large quick erect/strike shelter designed to accommodate up to 8 persons. The large shelter has a specially fitting front end wall that has a central opening that fits around the rear end of the trailer, thus allowing access from the interior of the shelter to the appliances or command post which are located at the rear of the trailer. There are two windows in the front end wall of the shelter which allow light to enter the interior from the front of the shelter. The shelter has 8 side windows (4 on each side, i.e., two per arch on each side of the center quad of the shelter) to provide sufficient available light during the daytime. The large trailer has a preferred interior area of just about 214 ft².

As an alternative embodiment, the large shelter can consist of two sections (not shown). The back end of the large shelter has an entrance/exit consisting of a roll-up fabric doorway to allow ingress/egress to the shelter. Further, the large shelter is divided into two sections with an entry, doorway, between the two sections to allow ingress and egress from the approximate center of the sides of the shelter.

Figure 14A:
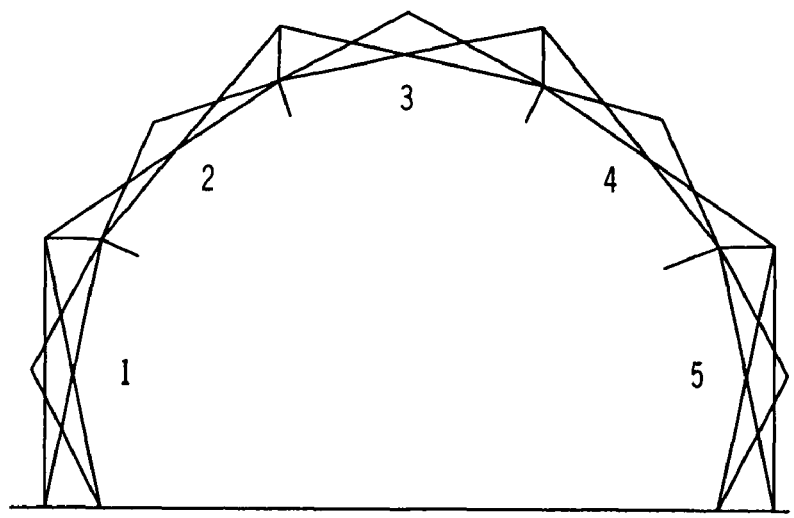
FIG. 14A is a front view cross-sectional representation of the perimeter outline of a smaller deployable structure.
Figure 14B:
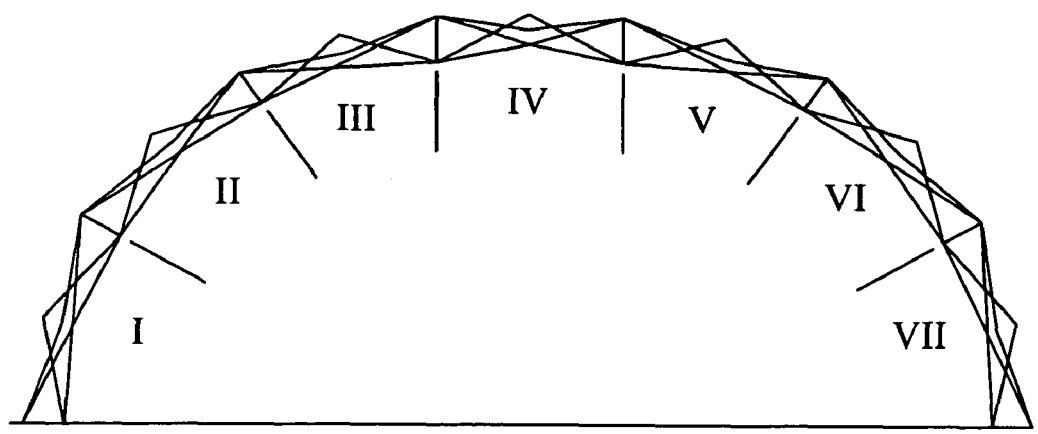
FIG. 14B is a front view cross-sectional representation the perimeter outline of a larger deployable structure of the present invention.

A front view cross-sectional representation of the structure (disclosed in the '695 patent) which is the preferred configuration of the present invention shelter used in combination with the trailer is depicted in FIG. 14A. This Figure shows the shelter with five quads (denoted I-V). This shelter uses the articulating hub assembly depicted in FIG. 17 wherein diameter of the tubular strut elements secured to the hub is about ⅝" (0.625" in). Each of the five quads found in the structure is 5 feet square.

In the event of a major catastrophic incident it may be necessary to utilize a larger shelter than the five quad shelter described above. In this instance, the configuration of the storage area in the trailer may have to be modified.

To form the preferred embodiment five (5) quad arch shelter as depicted in FIG. 16. FIG. 16 depicts a five (5) quad arch shelter having an ABABA arrangement. In this embodiment, two A quads (01-02 and 05-06) provide straight vertical height. The A quad (03-04) in the center of the shelter gives the additional width L desired along the horizontal axis. The B quads extend between 02 and 03 and 04 and 05, and also provide additional height as well as width ($L=\sqrt{x^2+y^2}$). FIG. 16 indicates that the angle between a vertical plane and a line segment connecting the exterior hub at 02 and the shared hub at 03 is 45°. FIG. 16 shows a riser 07 and floating hubs 08 and 08'. On a five Quad structure, there is both a riser and floating hubs. While the quad arrangement described with respect to FIG. 16 is the preferred embodiment for the small (2 arches side-by-side), medium arrangement (3 arches side-by-side) and large arrangement (4 arches side-by-side), other quad forming arrangements to form desired arches such as BBBB, BBABB, ABBAABBA, ABBABBA and BBBABBB depending upon the storage capacity of the trailer, may be used.

In the present invention, the skeletal framework is covered with flexible covering material to provide a covering enveloping the structure to result in the shelter function. A woven plastic, canvas material or some other type of durable weather resistant woven or non-woven fabric covering is secured to the outside of the erected structure to envelope the outside surface of the assembly. The exterior fabric must be weather resistant which encompasses water/snow/hail sleet resistant, ability to withstand ultraviolet degradation, is substantially wind proof, is fire resistant with impregnated fire retardants and is abrasion resistant. Fabric is also installed in the interior of the shelter to form a wall type interior in the covered shelter. There is an airspace between the exterior cover and the interior cover which creates an insulation against hot or cold weather conditions. The exterior covering can be one piece and may include flaps with zippers or similar edge connecting means for covering any openings or the like. The covering material is attached to the framework at the hub means in the manner disclosed in any one of the prior patents. Being fixed to the hub allows the arch portions of the framework to separate for expansion or collapsing. When the shelter framework has been expanded to its functionally operative condition, the flexible material on the exterior of the shelter matrix is held taut by the framework to which the material is attached. Because the covering material is some type of fabric whether woven or non woven, it possesses a given modulus of elasticity as a function of humidity and temperature. This elastic property of the fabric presents a problem when the shelter is erected because at the top of the shelter, when the fabric is under tension due to rain, snow falling on the top surface of the covering fabric, which is originally taut, will tend to form pools and weigh down the fabric to the point where it will sag and then collect the rain or snow in these pockets. The covering material will sag under the stress resulting from the buildup of water or ice in the stress/strain-induced pockets. The covering in the past has required a higher pitch on the frame because, in inclement conditions, the weight of rain, ice and snow can accumulate in pockets on the upper more horizontal quads. Also, since fabric expands and contracts with temperature and humidity, the exterior cover over time will also form troughs or pockets. This is especially true on the flatter sections toward and at the top of the shelter which would be the roof. This problem was solved by the development of the floating hub.

Pairs of floating hubs are used in the shelters of the present invention along with a fixed riser. The floating hub (See FIGS. 16, 8 and 8') allows the exterior cover on the shelter to form a sharply pitched exterior shape when in the expanded mode. Furthermore, the floating hub automatically recesses into the frame structure upon striking thereby reducing the tension on the cover and allowing it to fold into the collapsed frame.

The sharply pitched exterior cover formed by the floating hub prevents water, ice and snow from accumulating in troughs or low spots on the fabric cover. Without this floating hub, the exterior fabric cover would more closely follow the contours of the semi-circle arch of the supporting frame. Another important element is the "Riser" shown at 07 In FIG. 16, The floating hub increases the slope or pitch of the fabric cover on the sides of the Riser which serves to form a higher, sharper and stable ridge line at the top. Together the floating hub and Riser features increase the pitch of the exterior fabric cover and force ice, water and snow to slide off. If these two features were not integrated, the accumulation of ice, water and or snow would exceed the design limited of the structure and the shelter would collapse under too much weight.

With respect to the framework of the instant shelter, movement from the collapsed condition to the expanded condition involves expansion of the base of the structure from a bundled condition outwardly toward and finally to the fully expanded position of the base. Conversely, when the structure is collapsed, the base retreats inwardly from the fully expanded position to the bundled condition. Expansion is effected by pushing upwardly on the center of the structure allowing the sides to slide inward, and the base of the outermost quad to be parallel to the ground. Collapsing is effected by pulling outward on the outermost quad to make it perpendicular to the ground.

Figure 15:
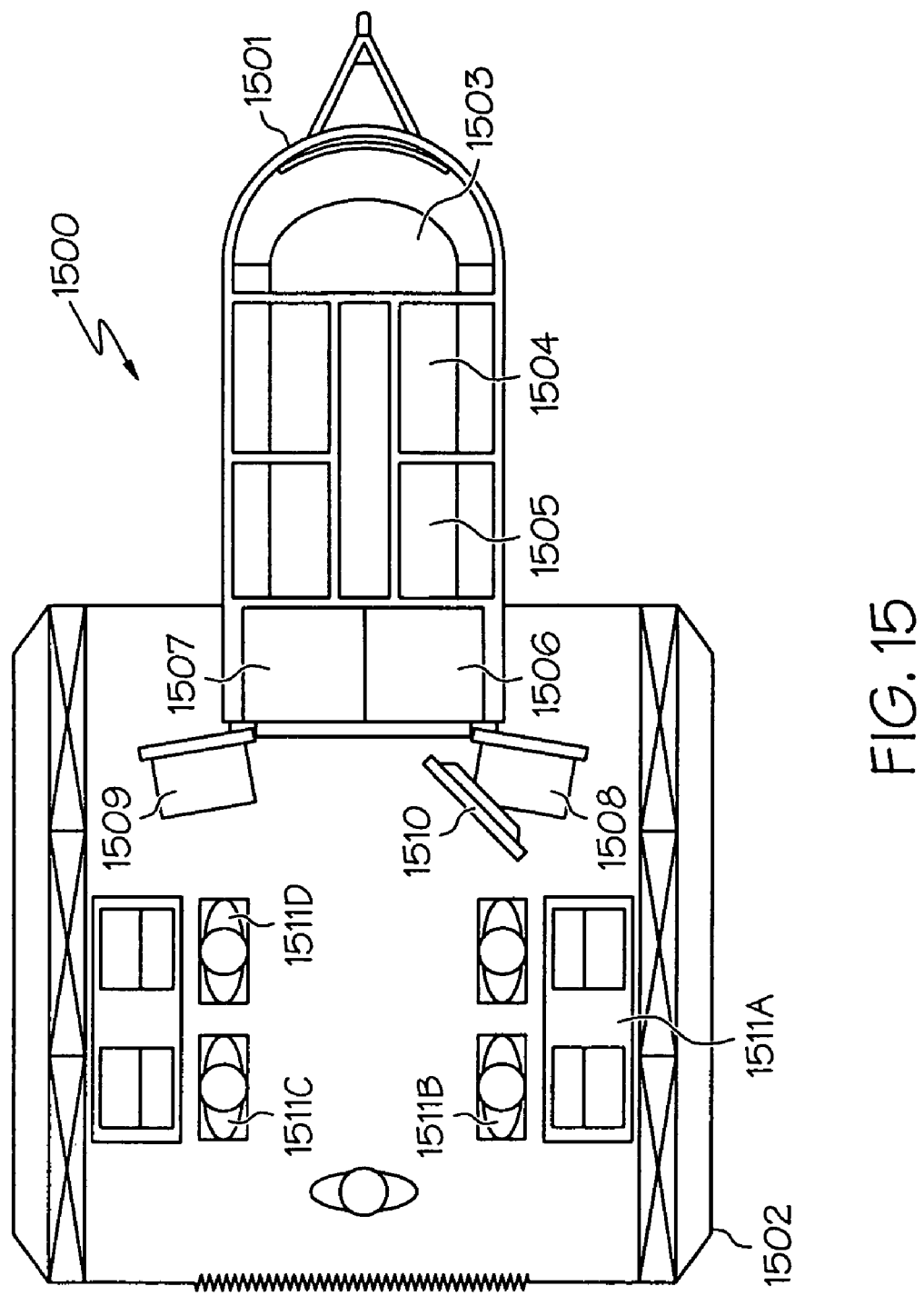
FIG. 15 is a top view of the Incident Command Post of the present invention showing the arrangement of elements in the trailer and shelter.

FIG. 15 is a top view of the Incident Command Post of the present invention showing the arrangement of elements in the trailer and a medium shelter. When an emergency situation is declared, the trailer when outfitted as a command post can be towed to the site promptly and set up for action. The combination unit 1500 comprising trailer 1501 and shelter 1502 serves as the command headquarters. Trailer 1501 contains a nose front section 1503 which serves to house an alternating current generator (gasoline or diesel) used to provide a supply of electricity (neither of which is shown). Aft of nose section 1503 is shelter storage compartment 1504 and general storage area 1505, both of which areas extend across the width of trailer 1501.

One end section of shelter 1502 envelopes A/V equipment stored in section 1506 and communications equipment stored in section 1507 of trailer 1501. Attached to the rear portion of trailer 1501 are work surfaces 1508 and 1509. LCD display 1510 is positioned on work space 1508. These physical arrangements can be modified to fit specific user requirements. In the shelter shown there are four table/work stations 1511A, 1511B, 1511C and 1511D. If a larger shelter is used there will be more tables/workstations in place.

While it is intended that the shelters described herein be used with the trailers disclosed above. It should be understood that any suitable shelter or tent configured to be used in combination with the instant trailers is included within the scope of this invention. Depending on the overall dimensions of the trailer, some of the larger shelters may not be suitable for storage within the trailer.

Although a preferred embodiment of the present invention and modifications thereof have been described in detail herein, it is to be understood that this invention is not limited to those precise embodiments and modifications, and that other modifications and variations may be affected by one of ordinary skill in the art without departing from the spirit and scope of the invention as defined in the appended claims.

What I claim and desire to protect by Letters Patent is:

1. A multi-purpose towable trailer comprising an undercarriage assembly frame having an axle and a set of wheels, an elongated streamlined body mounted on and secured to said undercarriage assembly frame;

said elongated streamlined body comprising a housing having a top component, a base floor component, a front component, a curb side component, a road side component, a rear section component;

said housing containing within it a base interior floor and three separate inverted U shaped framework bulkheads, each said bulkhead secured to said base interior floor and extending upwardly therefrom and secured to an underside of said top component;

said top component being a stringer-like member extending from a first framework bulkhead adjacent said front component to a third framework bulkhead at said rear component;

said front component comprising a front bumper, a front hood positioned atop in registry with and contiguous with said front bumper, said front bumper and said front hood in continuous combination defining a top view contour consisting of a substantially parabolic configuration in the horizontal plane, and said front bumper and said front hood in continuous combination defining a side view contour;

said front hood being hingedly affixed to a first said bulkhead so it can be opened and closed;

a first upright interior wall within said housing secured to said first framework bulkhead;

said first upright interior wall, said floor, said front bumper and said front hood defining a first storage compartment in said trailer housing;

on said curbside component of said trailer, a first gull wing door hingedly affixed to a first side of said top component, and on said roadside component of said trailer, a first gull wing door hingedly affixed to a second side of said top component;

a second upright interior wall within said housing secured to said second framework bulkhead; said second upright wall, said base floor component, said first interior upright wall and the space between said curbside first gull wing door and said first roadside gull wing door defining a second storage compartment within said trailer housing;

on said curbside component of said trailer housing, a second gull wing door hingedly affixed to said first side of said top, and on said roadside of said trailer housing, a second gull wing door hingedly affixed to a second side of said top, a third upright interior wall within said trailer housing secured to said third framework bulkhead; said third upright wall, said base floor component, said second interior upright wall and the space between said curbside second gull wing door and said second roadside gull wing door defining a third storage compartment in said trailer housing;

beneath said second curbside gull wing door and said second roadside gull wing door, a curbside wheel panel and a roadside wheel panel each extending to said rear section component of said housing;

said rear section component comprising a rear door element atop and in registry and contiguous with both a curbside tailgate and a roadside tailgate, said rear door element having three sides and a top planar surface and being hingedly affixed to said third framework bulkhead, a rear end portion of said top planar surface having substantially a Knolls edge profile to allow the air flowing over said top to separate from said housing with a minimum of turbulence;

said curbside tailgate and said roadside tailgate being hingedly affixed to said curbside wheel panel and said roadside wheel panel respectively;

a space within and delineated by said third interior upright wall, said curbside wheel panel, said roadside wheel panel, said curbside tailgate, said roadside tailgate and said top and sides of said rear door, defining a fourth storage compartment in said trailer housing.

2. The multi-purpose towable trailer defined in claim 1 which contains a slideable tray in said second storage compartment.

3. The multi-purpose towable trailer defined in claim 2 which contains a portable deployable shelter in a storage compartment.

4. The multi-purpose towable trailer defined in claim 3 which contains kitchen items comprising a sink, faucet, refrigerator, electrical A/C outlets, counter space, and cabinets.

5. The multi-purpose towable trailer defined in claim 3 which contains communication items comprising land mobile radios, multichannel radios, cellular phones, landline phones, a radio bridge for departmental interoperability, teleconference capabilities, satellite TV (with dish), internet capabilities as well as a display system for in-field information viewing.

6. The multi-purpose towable trailer defined in claim 3 in which contains a storage space beneath said hood which contains an A/C generator and compressed gas cylinders.

7. The multi-purpose towable trailer defined in claim 1 which contains a hitching system at the front of said trailer adapted to be affixed to means for towing.

8. The multi-purpose towable trailer defined in claim 1 wherein said hitching system contains a pair of brackets extending forward from said front of said trailer, said brackets being attached to hitching system components at the end thereof which are affixed to means for towing.

9. The multi-purpose towable trailer defined in claim 1 wherein said hitching system contains an adjustment shaft, a crank and wheel assembly connected to said pair of brackets.

10. The multi-purpose towable trailer defined in claim 1 wherein the set of wheels are tires made from an elastomeric material.

11. The multi-purpose towable trailer defined in claim 1 wherein said front section contains at least one compressed gas cylinder and an alternating current electrical generator.

12. A combination of a trailer as defined in claim 1 with a collapsible, self supporting shelter structure formed from a plurality of interconnected substantially square quad matrixes forming an arch, said quad comprising an articulating hub which connects pairs of crossed, pivotally-connected struts, said pairs of struts forming periphery comprising a top, bottom and sides of said quad, and a sub-assembly within said periphery of said quad having four pairs of crossing diagonal struts connected to a pair of articulating hub assemblies at each apex of said quad periphery and to a pair of hub assemblies in the center thereof, said quads forming said arch, have a bottom end and a top end and where applicable, said quads are interconnected end to end and are disposed in an elevated substantially arcuate form in which adjacent quads share common end-defining pairs of crossed, pivotally connected struts, and wherein a portion of said shelter covers a rear portion of said trailer.

13. The combination defined in claim 12 wherein said shelter structure is three dimensional along the X, Y and Z Cartesian axes.

14. The combination defined in claim 13 wherein said shelter has two interconnected arches side by side along said Z axis.

15. The combination defined in claim 13 wherein said shelter has three interconnected arches side by side along said Z axis.

16. The combination defined in claim 13 wherein said shelter has four interconnected arches side by side along said Z axis.

17. The combination defined in claim 13 wherein said quads are classified as an A quad and a B quad.

18. The combination defined in claim 12 wherein an A quad is an element of said arch, said A quad comprises a subassembly contained within the area defined by said top, base and sides thereof, which subassembly has a pair of center hubs comprising an exterior center hub and an interior center hub positioned substantially in-line substantially in the center of said quad with respect to each other, wherein four sets of two tubular struts each extend from said center hubs to top end and base end hubs of said quad and each set is connected at a scissor point substantially in the center of said pair of struts along their length.

19. The combination defined in claim 12 wherein a B quad is an element of said arch, said B quad comprises a subassembly contained within the area defined by said top, base and sides thereof, which subassembly has a pair of center hubs comprising an exterior center hub and an interior center hub positioned substantially in-line substantially in the center of said quad with respect to each other, wherein four sets of two tubular struts each extend from said center hubs to top end and base end hubs of said quad and each set is connected at a scissor point substantially off-center of the length of said pair of struts along their length.

20. The combination defined in claim 12 wherein said arch contains A and B quads, said A quad comprising a subassembly contained within the area defined by said top, base and sides thereof, which subassembly has a pair of center hubs comprising an exterior center hub and an interior center hub positioned substantially in-line substantially in the center of said quad with respect to each other, wherein four sets of two tubular struts each extend from said center hubs to top end and base end hubs of said quad and each set is connected at a scissor point substantially in the center of said pair of struts along their length;

and said B quad comprising a subassembly contained within the area defined by said top, base and sides thereof, which subassembly has a pair of center hubs comprising an exterior center hub and an interior center hub positioned substantially in-line substantially in the center of said quad with respect to each other, wherein four sets of two tubular struts each extend from said center hubs to top end and base end hubs of said quad and each set is connected at a scissor point substantially off-center of the length of said pair of struts along their length.

21. The combination defined in claim 20 wherein two arches are interconnected side by side, each said arch having a sequential quad arrangement of ABABA.

22. The combination defined in claim 20 wherein three arches are interconnected side by side, each said arch having a sequential quad arrangement of ABABA.

23. The combination defined in claim 20 wherein four arches are interconnected side by side, each said arch having a sequential quad arrangement of ABABA.

24. The combination defined in claim 20 wherein said structure is covered with a weather resistant fabric on the exterior of said shelter which is secured to the outside of the structure of said shelter to envelope the outside surface of the shelter and includes a fabric lining the interior walls and ceiling of said structure.

25. The combination defined in claim 20 wherein said arch has a sequential order of quads selected from the group consisting of BBBB, BBABB, ABBAABBA, ABBABBA and BBBABBB.

26. The combination defined in claim 20 each said articulating hub assembly is selected from the group consisting of a round hub assembly and an octagonal hub assembly.

27. The combination defined in claim 26 wherein said round articulating hub assembly comprises a hub body having a periphery, a central opening therethrough and a plurality of radial slots extending inwardly from said periphery of said hub body, each of said radial slots in said hub body having a discontinuous groove located perpendicular thereto, said hub body also having a series of openings extending through said hub body, said openings being positioned radially between each of said radial slots and between said periphery and said central opening of said hub body;

a hub cover having a periphery, a central opening therethrough, a plurality of radial slots and a series of openings extending through said hub cover, said hub body and said hub cover being assembled contiguously so that said central opening, said radial slots and said openings of said hub cover are in registry with said central opening, said radial slots and said openings of said hub body;

removable fastening means, said removable fastening means extending through said openings in said hub cover and being secured in said openings in said hub body;

an integrally formed keeper element having a top and a shaft extending downwardly therefrom, wherein said shaft is capable of being inserted and withdrawn from said central openings of said hub body and said hub cover, said shaft having means for securing said hub cover to said hub body.

28. The combination defined in claim 27 wherein said round articulating hub assembly also has a plurality of tangs, each of said tangs having a first and second sides, said each tang comprising a head section with a roll pin extending from each of said sides, said head section of said tang being positioned in one of said radial slots of said hub body and said hub cover in registry therewith, said tang being held in place by said roll pin nested in said discontinuous groove; and a cylindrical plug having a crown and a structural element secured to said tang.

29. The combination defined in claim 26 wherein said octagonal hub assembly comprises a hub body having rigid octagonally-shaped mating top and bottom components, said octagonal shape of said hub body defined by a periphery having eight straight edges at said periphery of said hub body and eight slits, each said slit extending radially inwardly from said periphery through said top and said bottom components from and normal to each said straight edges at said periphery of said hub body, each said slit is located at a vertex formed at intersections of each of said edges around said periphery of said hub body, and consistent with the octagonal configuration of said periphery of said hub body, adjacent slits emanating from each succeeding and preceding slit relative to said slit which is normal to said edge are aligned 45.degree, with respect thereto; and said hub top-component defined by a periphery, having an exterior and an interior surface, a central boss receiving opening, a plurality of said radial slits extending through said hub top, and a plurality of openings disposed radially toward the periphery of said hub top component, said openings being arranged to provide a single opening positioned in each of the areas defined in-between two adjacent said slits and arranged to conform to the position of said openings through said hub bottom when the hub top and hub bottom are joined; and said hub bottom-component wherein each of said edges of said periphery is in alignment with said edges of said top component, having an exterior and an interior surface, a boss extending upwardly from said interior surface of said bottom component, a central opening within said boss and a plurality openings disposed radially toward the periphery of said component, said openings being arranged to provide a single opening positioned in each of the areas defined in-between two adjacent said slits and arranged to conform to the position of said openings through said hub top when said hub top and said hub bottom are joined; and each said slit in said hub bottom component having a discontinuous groove located perpendicular thereto and extending across said slit into each of said areas defined in-between two adjacent said slits; said hub top component and said hub bottom component being assembled contiguously so that said central openings, said radial slits and said openings extending through said hub top component and said hub bottom component, and into said hub top component and said hub bottom component, are in registry; and a removable fastening means extending through said openings in said hub top component and being secured in said openings in registry therewith in said hub bottom component; and an integrally formed keeper element having a top and a shaft extending downwardly therefrom, wherein said shaft is capable of being inserted into and withdrawn from said central openings through said hub body and said hub cover, and said integrally formed keeper element, has means to secure said hub top component to said hub bottom component.

30. The combination defined in claim 29 wherein said octagonal hub assembly also has a plurality of tangs, each tang having a first side and a second side, a tail, and a head section with a roll pin extending from each side, said head section of said tang positioned in one of said radial slits in said hub bottom component and said hub top component in registry therewith, said tang being held in place by said roll pin nested in said discontinuous groove, and a cylindrical plug and a structural element secured to said tang.

31. The combination defined in claim 24 where said shelter has at least one pair of floating hubs in between a riser on the top of said shelter.

* * * * *